(12) United States Patent
Kawaguchi et al.

(10) Patent No.: US 7,714,819 B2
(45) Date of Patent: May 11, 2010

(54) LIQUID CRYSTAL DISPLAY

(75) Inventors: Seiji Kawaguchi, Osaka (JP); Kenji Nakao, Ishikawa (JP)

(73) Assignee: Toshiba Matsushita Display Technology Co., Ltd., Tokyo (JP)

( * ) Notice: Subject to any disclaimer, the term of this patent is extended or adjusted under 35 U.S.C. 154(b) by 861 days.

(21) Appl. No.: 10/528,416

(22) PCT Filed: Jan. 7, 2004

(86) PCT No.: PCT/JP2004/000045

§ 371 (c)(1), (2), (4) Date: Mar. 18, 2005

(87) PCT Pub. No.: WO2004/063801

PCT Pub. Date: Jul. 29, 2004

(65) Prior Publication Data

US 2006/0007096 A1   Jan. 12, 2006

(30) Foreign Application Priority Data

Jan. 8, 2003   (JP) ............................. 2003-002510
Apr. 14, 2003   (JP) ............................. 2003-109474

(51) Int. Cl.
*G09G 3/36*   (2006.01)
(52) U.S. Cl. ............................ 345/87; 345/94; 345/204
(58) Field of Classification Search .................. 345/87, 345/94, 204
See application file for complete search history.

(56) References Cited

U.S. PATENT DOCUMENTS 6,151,016 A   11/2000   Kanbe et al.
6,476,792 B2 *  11/2002   Hattori et al. ............... 345/102
6,853,435 B2 *   2/2005   Tanaka et al. ............... 349/177

(Continued)

FOREIGN PATENT DOCUMENTS

EP   0 996 028 A2   4/2000

(Continued)

OTHER PUBLICATIONS

Fumiaki Yamada, et al., "52.2: *Invited Paper*: Color Sequential LCD Based on OCB with an LED Backlight", SID 00 Digest, XP007007499A, vol. XXXI, 2000, pp. 1180-1183.

(Continued)

*Primary Examiner*—Bipin Shalwala
*Assistant Examiner*—Afroza Y Chowdhury
(74) *Attorney, Agent, or Firm*—Oblon, Spivak, McClelland, Maier & Neustadt, L.L.P.

(57) ABSTRACT

A liquid-crystal-panel drive and driving method capable of preventing unevenness on a display face from occurring after turning off a power supply in a liquid crystal display apparatus using OCB mode liquid crystal. The liquid crystal display apparatus includes a liquid crystal layer using OCB mode liquid crystal, a driver applying a voltage to the liquid crystal layer, a liquid-crystal driving power supply supplying power to the driver, and a switch outputting an on/off signal to the driver. When the switch outputs an off signal, the driver applies a predetermined voltage that can be applied to each pixel of the liquid crystal layer for a predetermined time, and after the elapse of the predetermined time, stops the supply of power to the driver from the liquid-crystal driving power supply.

17 Claims, 17 Drawing Sheets

U.S. PATENT DOCUMENTS

| | | |
|---|---|---|
| 6,927,825 B1 | 8/2005 | Koma et al. |
| 7,023,416 B1* | 4/2006 | Nakamura et al. ............ 345/99 |
| 7,483,007 B2* | 1/2009 | Chen et al. .................... 345/87 |
| 2001/0020925 A1* | 9/2001 | Hattori et al. ................. 345/87 |
| 2001/0020928 A1* | 9/2001 | Yanagisawa et al. .......... 345/98 |
| 2002/0057247 A1* | 5/2002 | Lee et al. ...................... 345/88 |
| 2002/0105490 A1 | 8/2002 | Kanbe et al. |
| 2002/0105613 A1 | 8/2002 | Yamakita et al. |
| 2002/0145579 A1* | 10/2002 | Yamakita et al. .............. 345/87 |
| 2002/0149549 A1* | 10/2002 | Ohta et al. .................... 345/87 |
| 2003/0048402 A1* | 3/2003 | Konno et al. ................ 349/141 |
| 2003/0053017 A1* | 3/2003 | Shi et al. .................... 349/123 |
| 2003/0122753 A1* | 7/2003 | Park ........................... 345/87 |
| 2003/0147029 A1* | 8/2003 | Liu ............................. 349/113 |
| 2004/0150605 A1* | 8/2004 | Arimoto et al. ............. 345/100 |
| 2006/0007209 A1* | 1/2006 | Nakamura et al. .......... 345/204 |
| 2006/0139274 A1* | 6/2006 | Song et al. .................... 345/90 |
| 2006/0244705 A1* | 11/2006 | Song et al. .................... 345/98 |

FOREIGN PATENT DOCUMENTS

| | | |
|---|---|---|
| EP | 1 091 236 A2 | 4/2001 |
| EP | 1 124 153 A2 | 8/2001 |
| JP | 61-116329 | 6/1986 |
| JP | 10-214067 | 8/1998 |
| JP | 11-295739 | 10/1999 |
| JP | 2000-75299 | 3/2000 |
| JP | 2000-321588 | 11/2000 |
| JP | 2002-6284 | 1/2002 |
| JP | 2003-287738 | 10/2003 |
| JP | 2003-295226 | 10/2003 |

OTHER PUBLICATIONS

N. Koma, et al., "5.2: Using an OCB-Mode TFT-LCD for High-Speed Transition from Splay to Bend Alignment", SID, XP007008825A, 1999, 4 pages.

* cited by examiner

Fig. 7

| Driving method | Time required for entire panel face to transit to splay orientation (s) |
|---|---|
| Image display → Power supply off (36s) | 36 |
| Image display → Black display → Power supply off (5s,6V) (20s) | 25 |
| Image display → Black display → White display → Power supply off (5s,6V) (2s,0V) (13s) | 20 |
| Image display → Application of high voltage → Power supply off (0.2s,25V) (11.8s) | 12 |
| Image display → Application of high voltage → White display → Power supply off (0.2s,25V) (2s,0V) (5.8s) | 8 |
| Image display → Application of high voltage → Black display → Power supply off (0.2s,25V) (0.1s,6V) (8.7s) | 9 |
| Image display → Application of high voltage → Black display → White display → Power supply off (0.2s,25V) (0.1s,6V) (1.5s,0V) (3.2s) | 5 |

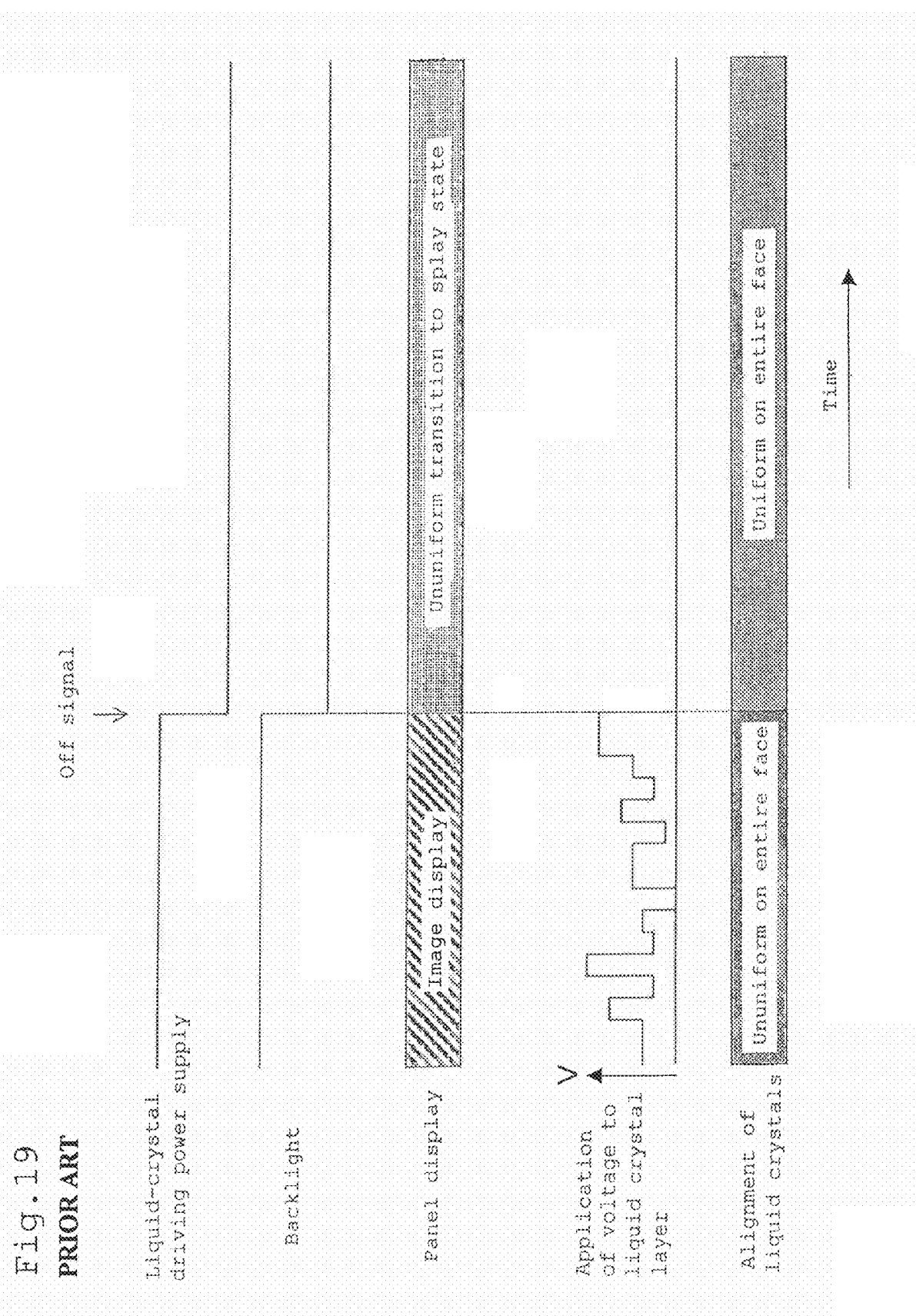

LIQUID CRYSTAL DISPLAY

TECHNICAL FIELD

The present invention relates to a liquid crystal display apparatus, its stopping method, a program, and a recording medium.

BACKGROUND ART

A liquid crystal display apparatus is thin and lightweight and the number of its applications has been further increased in recent years as a substitute for a conventional cathode ray tube. A TN (Twisted Nematic) oriented liquid-crystal panel widely used at present has a small angle of visibility and a low response speed and its liquid-crystal element is the holding type. Therefore, the panel is inferior to a cathode ray tube because it leaves traces for animation display.

In general, in the TN oriented liquid-crystal panel, a phenomenon has been observed that a display pattern remains even after turning off a power supply. When the liquid-crystal backlight goes out after turning off the power supply, a phenomenon, that is, an "OFF afterimage" occurs, in which display is thinly left and seen due to reflected light of external light at a place where the external light is strong. This is caused by the fact that because the potential accumulated in a pixel electrode is not discharged and operations are completed while a TFT is in an open state, electric charge is not released even after the power supply is turned off and a voltage is continuously applied to liquid crystal.

Therefore, the TN oriented liquid-crystal panel has solved the problem by using the sequence of turning on all gates of the TFT to release electric charge when the power supply is turned off and then completing operations after electric charge is released.

By using OCB (Optically Compensated Bend) mode liquid crystal having bend orientation (for example, refer to Japanese Patent Laid-Open No. 61-116329), it is possible to sufficiently correspond to animation display and an increased screen size with a high speed response and a wide angle of visibility and provide a large-screen display having smaller thickness and power consumption than a cathode ray tube.

The orientation of OCB mode liquid crystal includes splay orientation and bend orientation. As shown in FIG. 8(a) the splay orientation denotes liquid crystal orientation in a state in which a voltage is not applied to OCB mode liquid crystal (non-display state) and the bend orientation denotes liquid crystal orientation which is kept in a display state by applying a transfer voltage to the OCB mode liquid crystal. Transition from the bend orientation to the splay orientation is made by bringing an applied voltage into zero or below a counter-voltage Vc (hereafter referred to as inverse transfer) In this case, the counter-voltage Vc denotes a voltage in which the energy of the splay orientation is substantially balanced with the energy of the bend orientation and the splay orientation becomes stable at the voltage or lower.

However, even in the case of the OCB mode liquid crystal, an OFF afterimage occurs due to the above residual electric charge. Moreover, an OFF afterimage occurs in a mode other than the above mode. Therefore, this problem is not solved by only turning on gates of TFTs. Specifically, unevenness has been recognized on a display face unless the process in which the bend orientation used for display of the OCB mode liquid crystal transitions to the splay orientation is uniform. Particularly, because an image ununiformly disappears from a display face depending on a display pattern, uncomfortable feeling occurs to a user.

Specifically, when the OCB mode liquid crystal transitions from the bend orientation to the splay orientation, it progresses in accordance with the following steps. First, when a voltage to be applied to the OCB mode liquid crystal becomes 0 V, the bend orientation becomes unstable and 180° twist occurs in all regions. In this case, the 180° twist denotes liquid crystal orientation in which the alignment direction of liquid crystal molecules is twisted between an upper substrate and a lower substrate and its twist angle is 180°. This orientation state is recognized as transparent bright yellow for example. This twist orientation state may be referred to as second splay orientation.

When no voltage is applied to the OCB mode liquid crystal, the splay orientation is more stable than the twist orientation state. Therefore, a splay orientation region remaining on a display face and/or a splay orientation region that incidentally occurs by foreign matter or protrusion on the display face as a core grow. Finally, the entire display face becomes the splay orientation and is stabilized. This splay orientation is, for example, transparent blue.

A problem is that a state in which the twist orientation (yellow) and splay orientation (blue) after turning off the power supply are mixed is seen as an uneven state on a display face ununiformly or depending on the pattern at the time of display.

In the case of the OCB liquid crystal, when the transition from the bend orientation to the splay orientation is ununiform, it takes time for the entire face of a liquid-crystal layer to change to the splay orientation after turning off the power supply. FIG. 19 is a time chart showing operations when turning off the power supply of a liquid crystal display apparatus using conventional OCB mode liquid crystal (hereafter referred to as power-supply OFF sequence). According to the power-supply OFF sequence shown in FIG. 19, a backlight is turned off and at the same time, a voltage to be applied to the liquid crystal layer is turned off at the timing of turning off a liquid-crystal driving power supply.

According to this power-supply OFF sequence, a portion to be quickly changed to the splay orientation and a portion to be slowly changed to the splay orientation are produced when changing from the bend orientation to the splay orientation among display screens after turning off the power supply because the applied voltage of each portion of the liquid crystal layer depends on image display. Therefore, in a predetermined time until completely changing to the splay orientation after turning off the power supply, a portion of the liquid crystal layer is already changed to the splay orientation but an orientation state still between the bend orientation and the splay orientation (hereafter referred to as second splay orientation) occurs in another portion. In this case, when external light is strong, the difference between orientation states of various portions of the liquid crystal layer is seen as unevenness even if turning off the backlight. For example, at room temperature, approx. 5 sec is required for the change of all liquid crystal layers to the splay orientation.

Moreover, when turning on the power supply again, in a time until completely changing to the splay orientation after turning off the power supply, a long transfer driving period of changing to the bend orientation is necessary when the power supply is turned on and an excessive time is required until an image is displayed after turning on the power supply.

FIG. 20 shows a time chart showing operations of a liquid crystal display apparatus using OCB mode liquid crystal when turning on a power supply. When the power supply is turned on at the time t0, a factor for splay orientation to be disarranged is added to a liquid crystal layer due to wrap-around from various routes of a circuit immediately after the time t0. To correct the disarrangement of the splay orientation, 0 V is applied to the liquid crystal layer in the period from the time t0 to the time t1. Then, after the liquid crystal layer becomes uniform splay orientation, a transfer voltage for driving transfer of the liquid crystal layer is applied in the period from the time t1 to the time t2. After transfer driving is completed at the time t2, a voltage of displaying an image on a display face is applied to the liquid crystal layer.

In this case, when the power supply is turned on again, in the time until completely changing to the splay orientation after turning off the power supply as the above mentioned, disarrangement in second splay orientation is added to the disarrangement of the splay orientation that occurs when the power supply is turned on. Therefore, a long time is required from the time t0 to the time t1. For example, the period from t0 to t1 when the power supply is turned on in the state where the second splay orientation is not present is approx. 0.2 sec while the period from the time t0 to the time t1 when the power supply is turned on at the presence of the second splay orientation requires approx. 0.4 sec. Thus, when the second splay orientation is present, the period until an image is displayed after turning on the power supply is increased.

DISCLOSURE OF THE INVENTION

It is an object of the present invention to provide a liquid-crystal panel drive, driving method, its program, and recording medium capable of restraining unevenness of a display screen after turning off a power supply in a liquid crystal display apparatus using OCB mode liquid crystal by considering the above problems.

It is another object of the present invention to provide a liquid-crystal panel drive, a driving method and its program, and a recording medium making it possible for a display face to quickly transit from bend orientation to splay orientation after turning off a power supply in a liquid crystal display apparatus using OCB mode liquid crystal.

The 1st invention of the present invention is a liquid crystal display apparatus comprising:
  a liquid crystal layer using OCB mode liquid crystal;
  a driver applying a voltage to the liquid crystal layer;
  a liquid-crystal driving power supply supplying power to the driver; and
  a switch outputting an on/off signal to the driver; characterized in that
  when an off signal is output from the switch, the driver applies a predetermined voltage which can be applied to each of pixels of the liquid crystal layer for a predetermined time and after the elapse of the predetermined time, stops the supply of power to the driver from the liquid-crystal driving power supply.

The 2nd invention of the present invention is the liquid crystal display apparatus according to the 1st invention of the present invention, characterized in that
  a pixel electrode to which an individual voltage is applied with respect to each pixel and an opposed electrode arranged opposite to each pixel electrode are disposed on the liquid crystal layer,
  the predetermined voltage is a voltage equal to or higher than a critical voltage of OCB mode liquid crystal, and
  application of a voltage to each of the pixels is performed between the pixel electrode and the opposed electrode.

The 3rd invention of the present invention is the liquid crystal display apparatus according to the 2nd invention of the present invention, characterized in that
  the predetermined voltage is a voltage at which substantially black is displayed on a display face.

The 4th invention of the present invention is the liquid crystal display apparatus according to the 2nd invention of the present invention, characterized in that
  when an off signal is output from the switch, the driver applies a voltage at which substantially black is displayed on a display face to each of pixels of the liquid crystal layer and then, applies a voltage at which substantially white is displayed on the display face, and then stops the supply of power to the driver from the liquid-crystal driving power supply.

The 5th invention of the present invention is the liquid crystal display apparatus according to the 2nd invention of the present invention, characterized in that
  when an off signal is output from the switch, the driver applies a voltage higher than a voltage at which substantially black is displayed on a display face, to each of pixels of the liquid crystal layer for predetermined time instead of applying a predetermined voltage to each of the pixels and after the elapse of predetermined time, stops the supply of power to the driver from the liquid-crystal driving power supply.

The 6th invention of the present invention is the liquid crystal display apparatus according to the 2nd invention of the present invention, characterized in that
  when an off signal is output from the switch, the driver applies a voltage higher than a voltage at which substantially black is displayed on a display face, to each of pixels of the liquid crystal layer for predetermined time instead of applying the predetermined voltage to each of the pixels and after the elapse of the predetermined time, applies a voltage at which substantially white is displayed on the display face to each of the pixels, and then stops the supply of power to the driver from the liquid-crystal driving power supply.

The 7th invention of the present invention is the liquid crystal display apparatus according to the 6th invention of the present invention, characterized in that
  after the elapse of predetermined time, a voltage at which substantially black is displayed on a display face is applied instead of applying the voltage at which substantially white is displayed on the display face.

The 8th invention of the present invention is the liquid crystal display apparatus according to the 2nd invention of the present invention, characterized in that
  when an off signal is output from the switch, the driver applies a voltage higher than a voltage at which substantially black is displayed on a display face and equal to or lower than a maximum voltage which can be applied to the liquid crystal layer, to each of pixels of the liquid crystal layer for predetermined time instead of applying the predetermined voltage to each of the pixels and after the elapse of the predetermined time, applies a voltage at which substantially black is displayed on the display face, after the voltage at which substantially black is displayed on the display face is applied, applies a voltage at which substantially white is displayed on the display face, and after the voltage at which substantially white is displayed is applied, stops the supply of power to the driver from the driving power supply.

The 9th invention of the present invention is the liquid crystal display apparatus according to the 4th invention of the present invention, characterized in that
  the voltage at which substantially white is displayed on the display face represents that a voltage between the opposed electrode and the pixel electrode, and a voltage between a gate line and the pixel electrode or a voltage between the pixel electrode and an electrode other than the pixel electrode are substantially zero.

The 10th invention of the present invention is the liquid crystal display apparatus according to the 6th invention of the present invention, characterized in that the voltage at which substantially white is displayed on the display face represents that a voltage between the opposed electrode and the pixel electrode, and a voltage between a gate line and the pixel electrode or a voltage between the pixel electrode and an electrode other than the pixel electrode are substantially zero.

The 11th invention of the present invention is the liquid crystal display apparatus according to the 7th invention of the present invention, characterized in that the voltage at which substantially white is displayed on the display face represents that a voltage between the opposed electrode and the pixel electrode, and a voltage between a gate line and the pixel electrode or a voltage between the pixel electrode and an electrode other than the pixel electrode are substantially zero.

The 12th invention of the present invention is the liquid crystal display apparatus according to the 8th invention of the present invention, characterized in that the voltage at which substantially white is displayed on the display face represents that a voltage between the opposed electrode and the pixel electrode, and a voltage between a gate line and the pixel electrode or a voltage between the pixel electrode and an electrode other than the pixel electrode are substantially zero.

The 13th invention of the present invention is the liquid crystal display apparatus according to the 2nd invention of the present invention further comprising a backlight connected to the liquid-crystal driving power supply to irradiate the liquid crystal layer, characterized in that when an off signal is output from the switch, irradiation from the backlight is stopped simultaneously when or before a predetermined voltage is applied to each of pixels of the liquid crystal layer from the driver.

The 14th invention of the present invention is the liquid crystal display apparatus according to the 3rd invention of the present invention further comprising a backlight connected to the liquid-crystal driving power supply to irradiate the liquid crystal layer, characterized in that when an off signal is output from the switch, irradiation from the backlight is stopped simultaneously when or before a predetermined voltage is applied to each of pixels of the liquid crystal layer from the driver.

The 15th invention of the present invention is the liquid crystal display apparatus according to the 4th invention of the present invention further comprising a backlight connected to the liquid-crystal driving power supply to irradiate the liquid crystal layer, characterized in that when an off signal is output from the switch, irradiation from the backlight is stopped simultaneously when or before a predetermined voltage is applied to each of pixels of the liquid crystal layer from the driver.

The 16th invention of the present invention is the liquid crystal display apparatus according to the 5th invention of the present invention further comprising a backlight connected to the liquid-crystal driving power supply to irradiate the liquid crystal layer, characterized in that when an off signal is output from the switch, irradiation from the backlight is stopped simultaneously when or before a predetermined voltage is applied to each of pixels of the liquid crystal layer from the driver.

The 17th invention of the present invention is the liquid crystal display apparatus according to any one of the 2nd to the 16th inventions of the present invention, characterized in that the voltage to be applied to each of pixels is an alternating voltage.

The 18th invention of the present invention is the liquid crystal display apparatus according to any one of the 2nd to the 16th inventions of the present invention, characterized in that the predetermined voltage is a uniform voltage for each of the pixels.

The 19th invention of the present invention is the liquid crystal display apparatus according to the 17th invention of the present invention, characterized in that the predetermined voltage is a uniform voltage for each of the pixels.

The 20th invention of the present invention is the liquid crystal display apparatus according to the 1st invention of the present invention, characterized in that the liquid crystal layer is provided with a pixel electrode which is connected to the driver and to which a pixel voltage is supplied and a specific electrode which is connected to the driver, to which a voltage different from the pixel voltage is supplied, and which is disposed via a dielectric so as to be opposed to the pixel electrode, the pixel electrode is disposed so that at least a part of the contour of the pixel electrode is not vertical to the oriented direction of the OCB mode liquid crystal, when an off signal is output from the switch, the driver generates an electric field in a direction different from the oriented direction of the OCB mode liquid crystal between the pixel electrode and the specific electrode and after the elapse of predetermined time, stops the supply of power to the driver from the liquid-crystal driving power supply.

The 21st invention of the present invention is the liquid crystal display apparatus according to the 20th invention of the present invention, characterized in that the contour of the pixel electrode includes a first portion which generates an electric field not vertical to the oriented direction of the OCB mode liquid crystal but in a direction of twisting a part of the oriented-directional liquid crystal in one direction in a pixel and a second portion which generates an electric field in a direction of twisting another part of the oriented-directional liquid crystal in other direction.

The 22nd invention of the present invention is the liquid crystal display apparatus according to the 21st invention of the present invention, characterized in that the first portion and the second portion are substantially parallel with the oriented direction of the OCB mode liquid crystal and alternately continuously formed.

The 23rd invention of the present invention is the liquid crystal display apparatus according to the 20th invention of the present invention, characterized in that an opposed electrode arranged opposite to each of the pixel electrodes is further disposed on the liquid crystal layer, when an off signal is output from the switch, the driver applies a voltage for substantially white display on a display face, between each of the pixel electrodes of the liquid crystal layer and the opposed electrode, thereafter, stops the supply of power to the driver from the liquid-crystal driving power supply.

The 24th invention of the present invention is the liquid crystal display apparatus according to the 20th invention of the present invention, characterized in that when an off signal is output from the switch, the driver applies a predetermined voltage equal to or higher than a critical voltage of the OCB mode liquid crystal but equal to or lower than the maximum voltage which can be applied to the liquid crystal layer to each of pixels of the liquid crystal layer, thereafter, applies a voltage for substantially white display on a display face, thereafter stops the supply of power to the driver from the liquid-crystal driving power supply.

The 25th invention of the present invention is the liquid crystal display apparatus according to the 24th invention of the present invention, characterized in that an electric field in a direction different from the oriented direction of the OCB mode liquid crystal is applied simultaneously when or after the voltage for white display on the display face is applied.

The 26th invention of the present invention is the liquid crystal display apparatus according to the 20th invention of the present invention, characterized in that two pixel electrodes adjacent in the oriented direction of the OCB liquid crystal mode are arranged on the specific electrode via a dielectric, and contours of the two pixel electrodes are arranged so that they are not vertical to the oriented direction of the OCB mode liquid crystal and include a first portion of generating an electric field in a direction of twisting a part of the oriented-directional liquid crystal in one direction in a pixel and a second portion of generating an electric field in a direction of twisting another part of the oriented-directional liquid crystal in other direction.

The 27th invention of the present invention is the liquid crystal display apparatus according to the 26th invention of the present invention, characterized in that the driver applies voltages having phases opposite to each other to the two pixel electrodes.

The 28th invention of the present invention is a liquid crystal display apparatus having a liquid crystal layer using OCB mode liquid crystal, in which a pixel electrode to which an individual pixel voltage is applied with respect to each pixel and an opposed electrode arranged opposite to the pixel electrodes are disposed, a non-voltage region having no voltage to the opposed electrode is formed for each pixel in a region within the same face as the pixel electrode, and the size of the non-voltage region is such that even if the liquid crystal layer becomes bend orientation, at least a part of the region can maintain splay orientation.

The 29th invention of the present invention is the liquid crystal display apparatus according to the 28th invention of the present invention in which the size of the non-voltage region is 400 $\mu m^2$ or more.

The 30th invention of the present invention is a liquid-crystal-display stopping method comprising:

a step of inputting an OFF signal to a driver of applying a voltage to a liquid crystal layer using OCM mode liquid crystal; and a step of applying a predetermined voltage that can be applied to each pixel of the liquid crystal layer by the driver for a predetermined time when the OFF signal is input; and a step of stopping supply of power to the driver from a liquid crystal driving source supplying power to the driver after the predetermined period elapses.

The 31st invention of the present invention is a program of making a computer function as a driver in the liquid crystal display apparatus according to the $1^{st}$ invention applying a predetermined voltage that can be applied to each pixel of the liquid crystal layer for a predetermined time when an OFF signal is output from the switch and after the predetermined time elapses, stopping supply of power to the driver from the liquid-crystal driving power supply.

The 32nd invention of the present invention is a recording medium carrying the program according to the 31st invention of the present invention, which can be processed by a computer.

According to the present invention, it is possible to provide a liquid-crystal-panel drive, a driving method and its program, and a recording medium capable of restraining the unevenness of a display screen after turning off a power supply in a liquid crystal display apparatus using OCB mode liquid crystal.

Moreover, according to the present invention, it is possible to provide a liquid-crystal-panel driver, driving method and its program, and a recording medium in a liquid crystal display apparatus using OCB mode liquid crystal in which a display face can quickly change from bend orientation to splay orientation after turning off a power supply.

BRIEF DESCRIPTION OF THE DRAWINGS

FIG. 7 is an illustration showing specific data when executing the liquid crystal display apparatuses of the embodiments 1 to 3 of the present invention;

FIG. 8(*b*) is an illustration of explaining splay orientation and bend orientation in the present invention and the prior art;

FIG. 17(*b*) is a plane view showing a pixel structure of the liquid crystal display apparatus of the embodiment 4 of the present invention;

FIG. 18(*b*) is a plane view showing a pixel structure of the liquid crystal display apparatus of the embodiment 4 of the present invention;

FIG. 19 is an illustration showing operations of a conventional liquid crystal display apparatus.

DESCRIPTION OF REFERENCE NUMERALS

1 Liquid crystal layer
2 Driver
3 Liquid-crystal driving power source portion
4, 6 Switch
5 Backlight

BEST MODE FOR CARRYING OUT THE INVENTION

Embodiment 1

Figure 1:
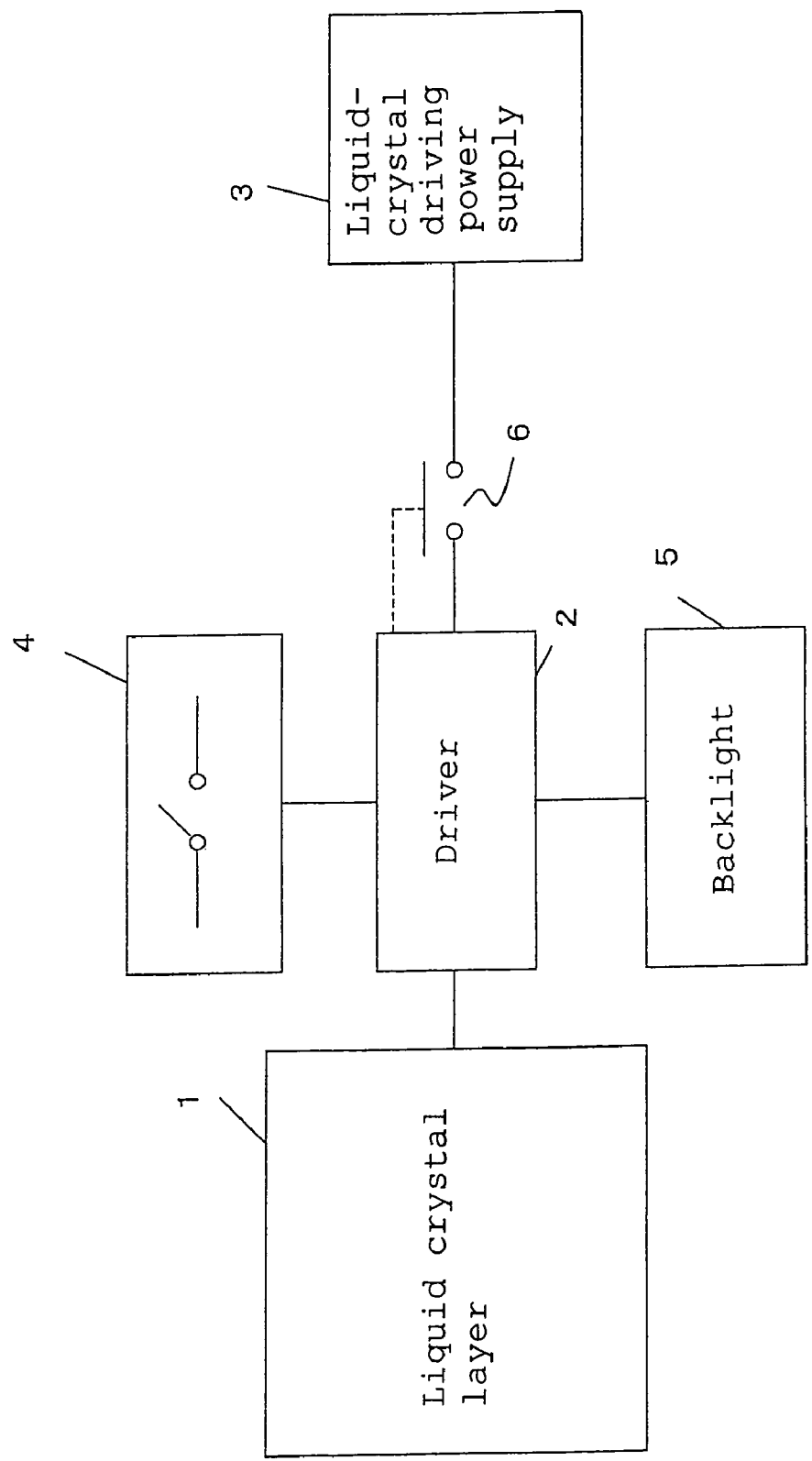
FIG. 1 is a block diagram showing the configuration of the liquid crystal display apparatuses of embodiments 1 and 2 of the present invention.

FIG. 1 is a block diagram showing a configuration of the liquid crystal display apparatus of the embodiment 1 of the present invention. A driver 2 which is an example of a driver of the present invention of applying a voltage to a liquid crystal layer 1, which uses OCB mode liquid crystal, of an example of a liquid crystal layer of the present invention is connected to the liquid crystal layer 1. A backlight 5 of irradiating a display face constituted by the liquid crystal layer 1 and a switch 4 of turning on/off the power supply of the liquid crystal display apparatus of the present invention are connected to the driver 2. A liquid crystal driving power supply portion 3 of a liquid crystal power supply of an example of a liquid crystal driving power supply of the present invention for supplying power to the driver 2 and the backlight 5 is connected to the driver 2 through a switch 6.

Figure 6:
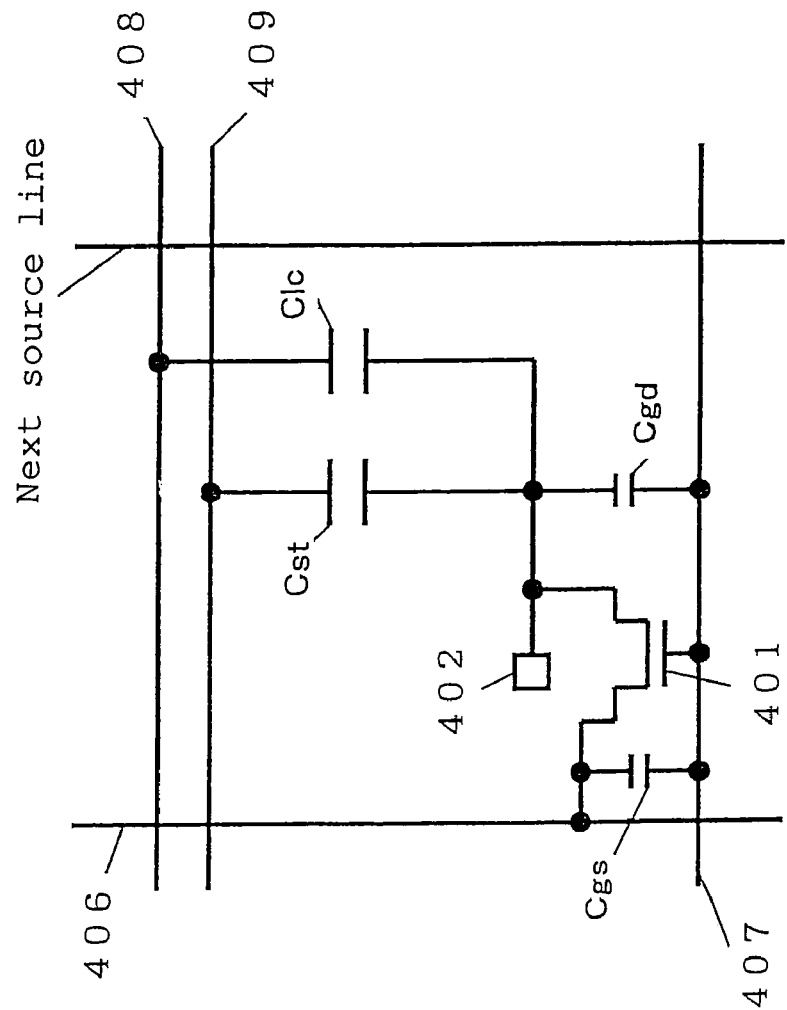
FIG. 6 is an illustration showing a pixel circuit of the liquid crystal display apparatuses of the embodiments 1 to 3 of the present invention.

FIG. 6 is a circuit diagram showing a configuration of the liquid crystal layer 1. A source line 406, gate line 407, pixel transistor 401, pixel electrode 402, opposed electrode 408, and common electrode capacity Cst are arranged on the liquid crystal layer 1. Moreover, the gate line 407 is connected to the gate side of the pixel transistor 401 and the source line 406 is connected to the source side of the pixel transistor 401. A pixel electrode 402 and one side of the common electrode capacity Cst are connected to the drain side of the pixel transistor 401. A common electrode 409 is connected to the other side of the common electrode capacity Cst. A parasitic capacity Cgs is present at the gate side and source side of the pixel transistor 401 and a parasitic capacity Cgd is present between the gate side and the drain side of the pixel transistor 401. Moreover, a liquid crystal capacity Clc is present between the pixel electrode 402 and the opposed electrode 408.

Figure 5:
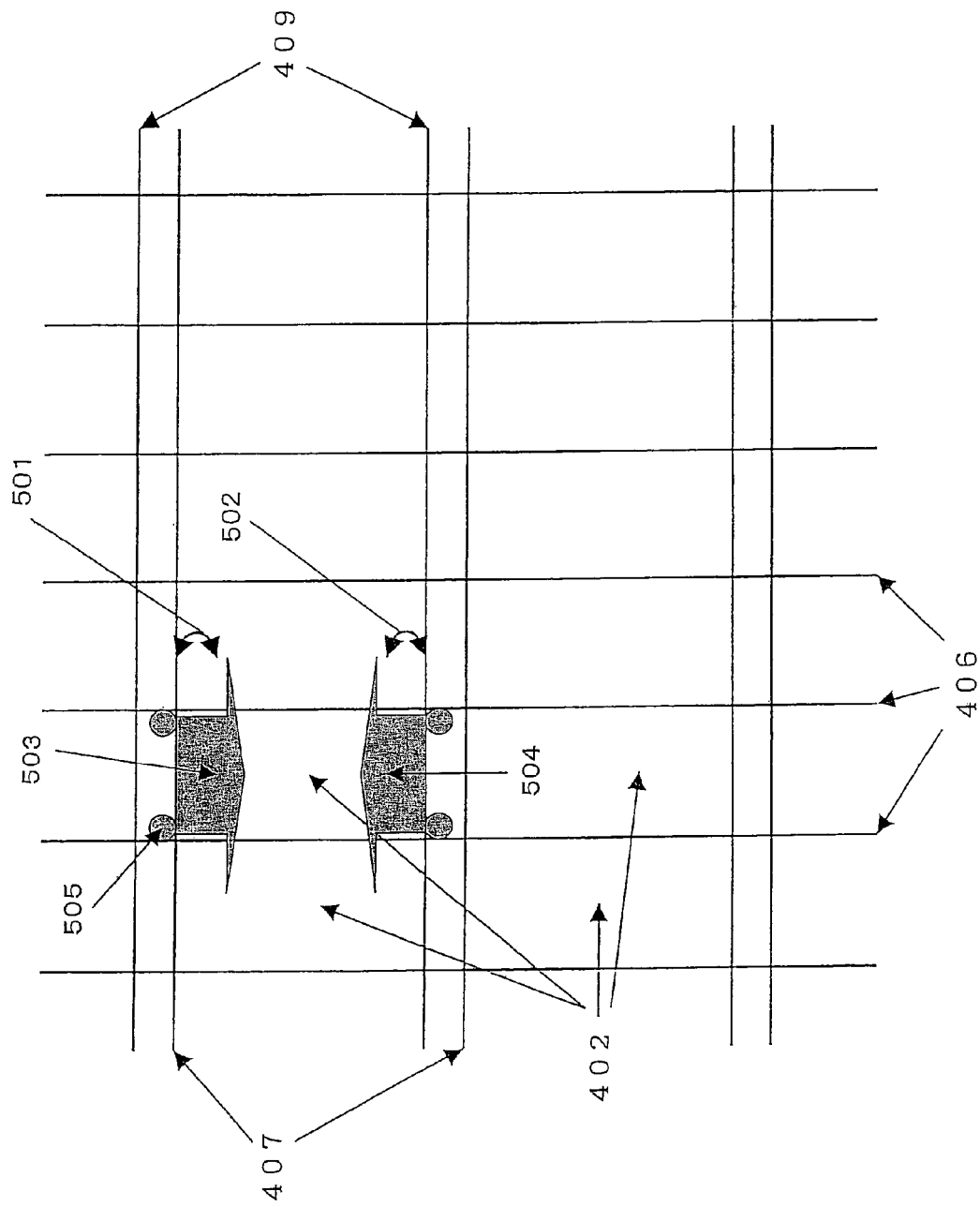
FIG. 5 is an illustration showing a planar structure of the liquid crystal layer of the liquid crystal display apparatuses of the embodiments 1 to 3 of the present invention.

FIG. 5 is a plane view showing an internal structure of the liquid crystal layer 1. As shown in FIG. 5, each pixel electrode 402 is surrounded by the gate line 407, common electrode 409, and source line 406.

Then, operations of the liquid crystal display apparatus of this embodiment having the above configuration are described below.

Figure 20:
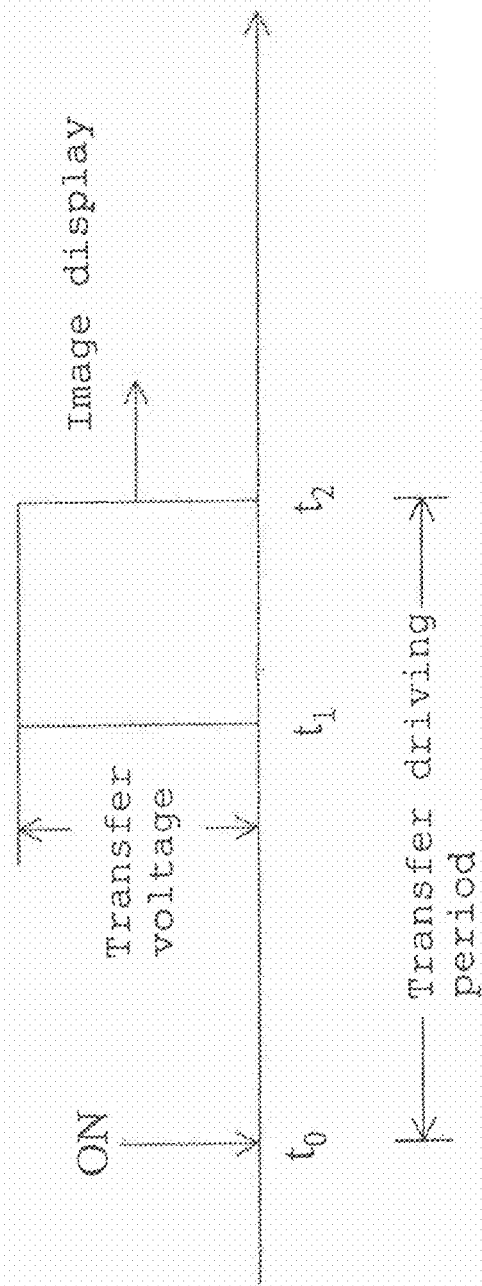
FIG. 20 is an illustration showing operations of a conventional liquid crystal display apparatus.

Because the operation of the liquid crystal display apparatus of this embodiment when the power supply is turned on is the same as the operation shown in FIG. 20, its description is omitted. The operation of the liquid crystal display apparatus of this embodiment when the power supply is turned off is described below.

Figure 2:
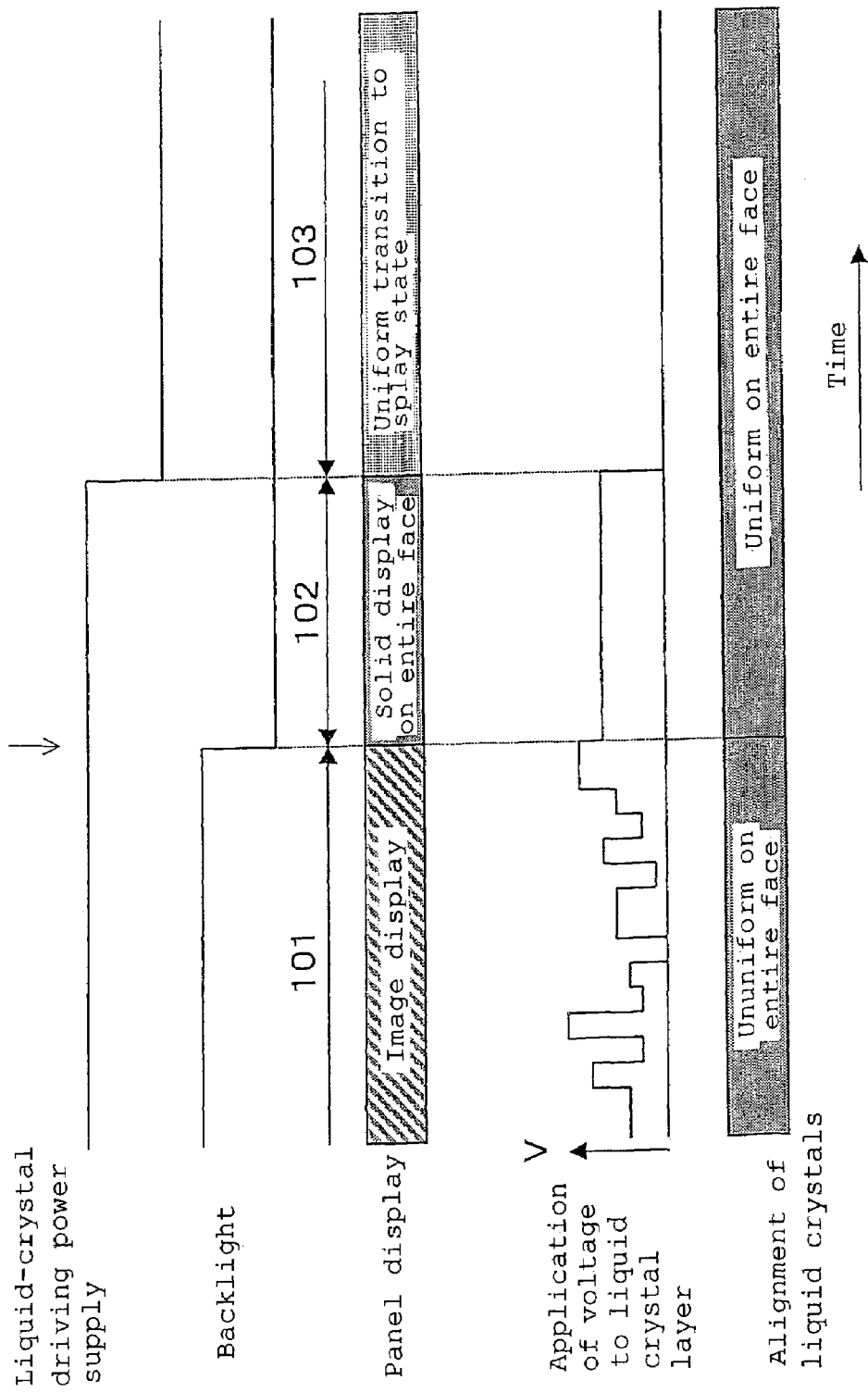
FIG. 2 is an illustration showing operations of the liquid crystal display apparatus of the embodiment 1 of the present invention.

FIG. 2 is a time chart showing a power-supply OFF sequence of the liquid crystal display apparatus of the embodiment 1. In the image display period 101 shown in FIG. 2, various voltages of displaying an image on the display face are applied to the liquid crystal layer 1 from the driver 2. That is, because voltages to be applied to the liquid crystal layer 1 differ in the region of the liquid crystal layer 1 depending on an image to be displayed, the alignment of liquid crystals is ununiform.

When the switch 4 is turned off (that is, when an OFF signal is output from the switch 4), the driver 2 completes the image display period 101, turns off the backlight 5, and starts an OFF sequence period 102. In the OFF sequence period 102, when a display screen is normally white, the driver 2 applies a constant voltage to the liquid crystal layer 1 to display black gradation on the display face. When the voltage in the OFF sequence period 102 is constant, alignment of liquid crystals of various portions in the liquid crystal layer 1 becomes uniform. It is preferable that the OFF sequence period 102 continues for 2 sec or more.

When the OFF sequence period 102 is completed, the driver 2 starts a power-supply OFF period 103. When the power-supply OFF period 103 is started, the driver 2 opens the switch 6 to cut off the power to be supplied from the liquid crystal driving power supply portion 3. In this case, because the alignment of liquid crystals of the liquid crystal layer 1 is uniform and the voltage to be applied to the liquid crystal layer 1 becomes 0 V, the OCB mode liquid crystal can uniformly change from bend orientation to splay orientation.

Therefore, according to the liquid crystal display apparatus of this embodiment, unevenness does not occur at the portion of splay orientation and the portion of bend orientation after turning off the liquid crystal driving power supply 4 and the unevenness is not seen on the display face even if external light is strong.

Moreover, even if the power supply is turned on again within 5 sec after 2 sec passes from turning off the power supply at room temperature, the period until an image is displayed after turning on the power supply again is decreased because the second splay orientation is not present. For example, in the case of a conventional liquid crystal display apparatus in which the second splay orientation is present, when turning on the power supply again within approx. 3 sec after turning off the power supply at room temperature, approx. 0.4 sec is required for an image to be displayed. However, according to the liquid crystal display apparatus of this embodiment, an image is displayed within approx. 0.2 sec after turning on the power supply again.

In the above description, the driver 2 displays black gradation on the entire display face in the OFF sequence period 102. However, it is also allowed that substantially black gradation is displayed on the display face. Moreover, it is allowed that medium gradation or white gradation is displayed. Even in this case, when a voltage to be applied to each portion of the liquid crystal layer 1 is constant, the similar advantage as described above can be obtained though in varying degrees because the alignment of liquid crystals of the liquid crystal layer 1 becomes a uniform state.

However, when the display face is changed to white display in the OFF sequence period 102, it is considered that some portions do not change to the bend orientation and the splay orientation ununiformly remains depending on a pixel so that the display face is seen uneven though this is a problem of degree. Therefore, it is preferable that a voltage at which middle gradation is displayed or higher is applied to the liquid crystal layer 1 in the OFF sequence period 102. In this case, it is the most preferable that black gradation is substantially displayed on the display face.

Figure 8A:
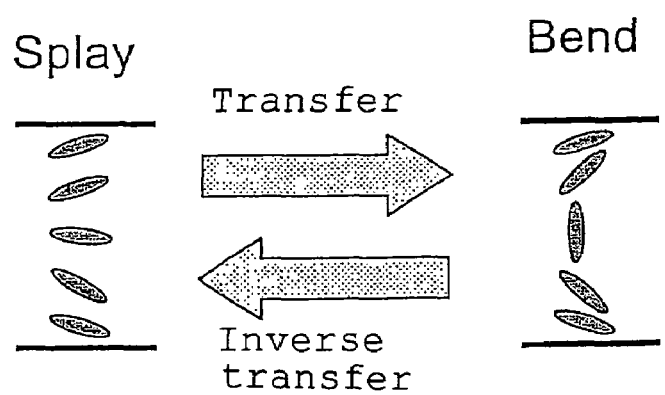
FIG. 8(*a*) is an illustration of explaining splay orientation and bend orientation in the present invention and the prior art.
Figure 8B:
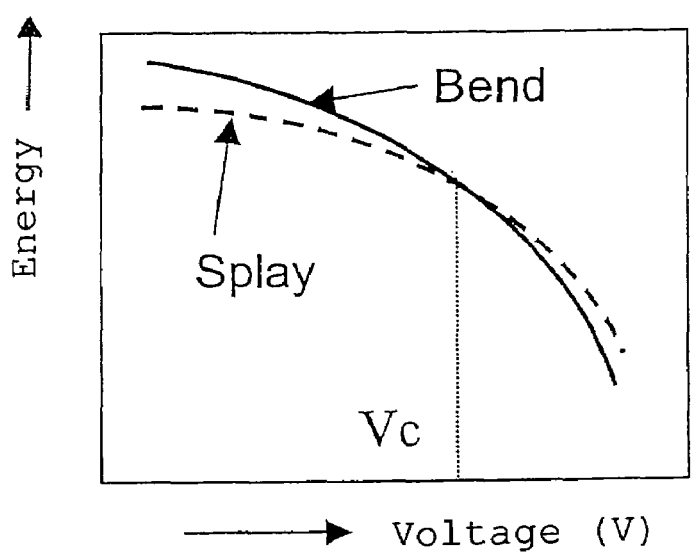

More specifically, as shown in FIG. 8(*a*), the OCB mode liquid crystal changes from the splay orientation to the bend orientation when a transfer voltage is applied to the liquid crystal layer 1, and when the applied voltage disappears, inverse transfer from the bend orientation to the splay orientation occurs. FIG. 8(*b*) shows respective energy states of the bend orientation and splay orientation due to a change of voltages. FIG. 8(*b*) shows a result of energy calculation through a simulation and the sum of elastic energy and electric energy. The energy of the bend orientation coincides with the energy of the splay orientation at a certain voltage (hereafter referred to as critical voltage Vc).

Moreover, FIG. 8(*b*) shows that when a voltage higher than the critical voltage is applied to the liquid crystal layer 1, the bend orientation is stabilized in energy and when a voltage lower than the critical voltage is applied to the liquid crystal layer 1, the splay orientation is stabilized in energy. Therefore, when a voltage lower than the critical voltage is applied to the liquid crystal layer 1, it finally returns to the splay orientation. Therefore, it is preferable that a voltage equal to or higher than the critical voltage is applied to the liquid crystal layer 1 in the OFF sequence period 102 in order to exclude the splay orientation ununiformly remaining on the display face as much as possible. This is because when a voltage equal to or higher than the critical voltage is applied, it becomes possible to uniform the density of a splay core.

Figure 9:
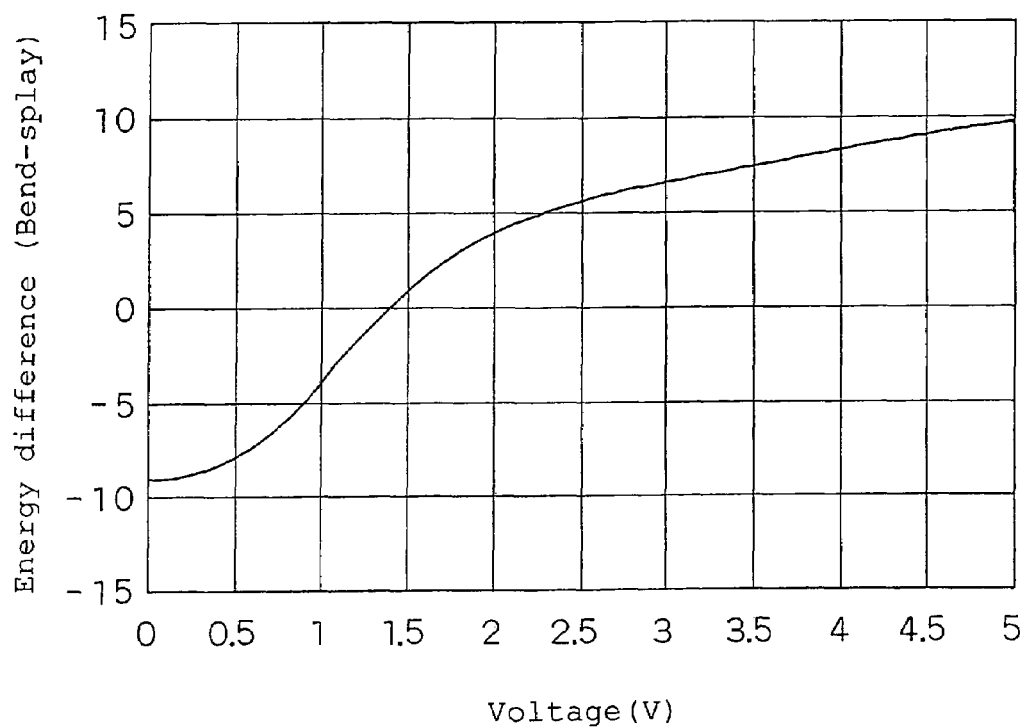
FIG. 9 is an illustration of explaining energies of splay orientation and bend orientation in the present invention and the prior art.

FIG. 9 shows an energy difference between the splay orientation and the bend orientation at each voltage of OCB mode liquid crystal. From FIG. 9, it is found that a critical voltage at which the energy difference becomes zero is approx. 1.4 V.

Embodiment 2

Figure 3:
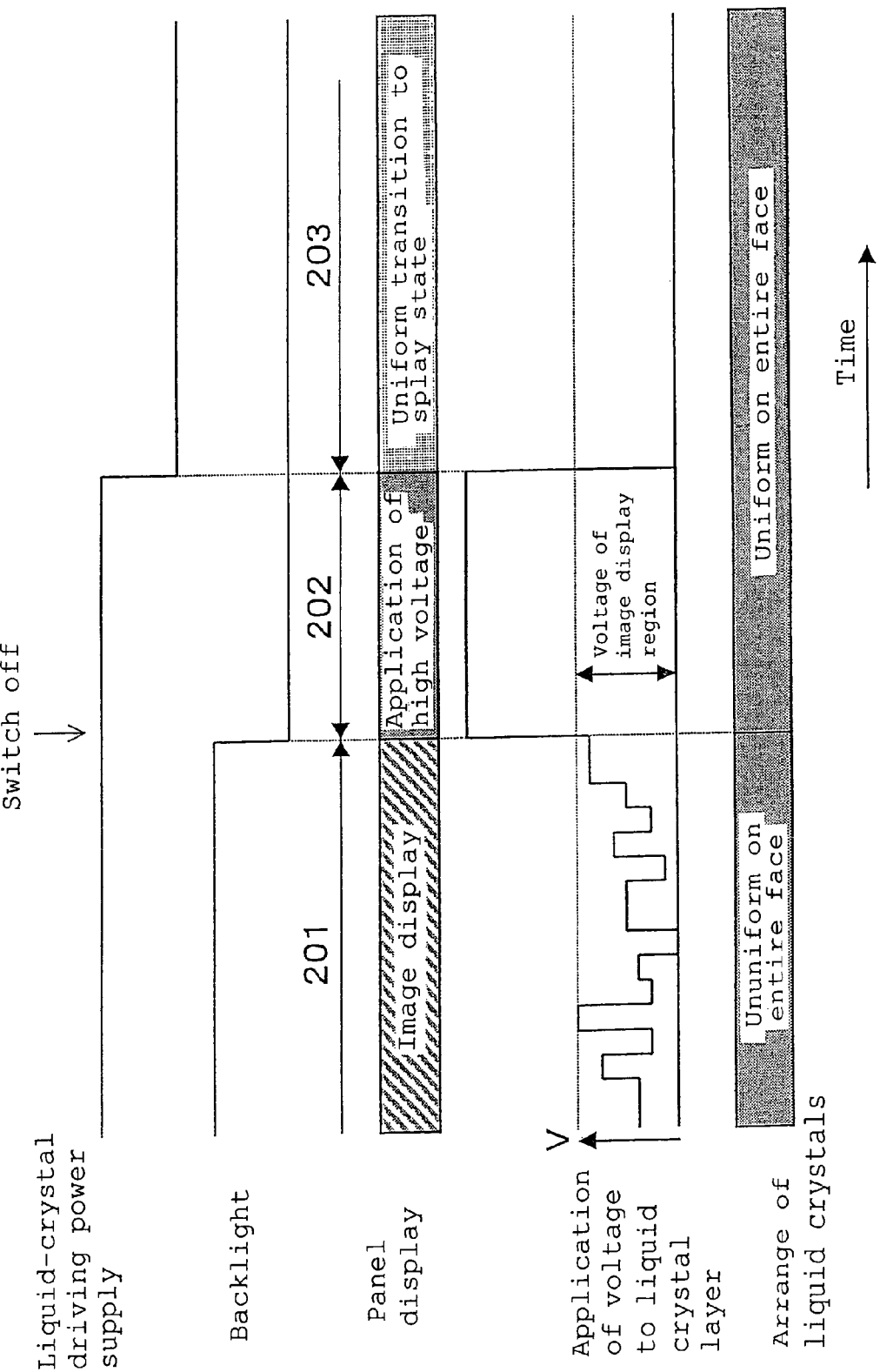
FIG. 3 is an illustration showing operations of the liquid crystal display apparatus of the embodiment 2 of the present invention.

FIG. 3 shows a time chart of the power supply OFF sequence of a liquid crystal display apparatus of embodiment 2 of the present invention.

Because the configuration of the liquid crystal display apparatus of this embodiment is the same as that of the liquid crystal display apparatus of the embodiment 1, its description is omitted.

In the image display period 201 shown in FIG. 3, various voltages for displaying an image on a display face are applied to the liquid crystal layer 1 from the driver 2. That is, because voltages to be applied to the liquid crystal layer 1 differ in the region of the liquid crystal layer depending on an image to be displayed, the alignment of liquid crystals becomes ununiform.

When the switch 4 is turned off, the driver 2 completes the image display period 201, turns off the backlight 5, and starts an OFF sequence period 202. In the OFF sequence period 202, the driver 2 applies a voltage equal to or lower than a maximum voltage which can be applied to the liquid crystal layer 1 and which exceeds the voltage of an image display region to the whole of the liquid crystal layer 1. In this case, it is preferable that a voltage to be applied to the liquid crystal layer 1 in the OFF sequence period 202 is 1.5 times or higher than a voltage applied for black display.

When a voltage in the OFF sequence period 202 is constant and higher than the voltage for black display (black display voltage), the alignment of liquid crystals in the liquid crystal layer 1 more quickly becomes uniform. Moreover, when the voltage to be applied to the liquid crystal layer 1 is higher than the black display voltage, it becomes possible to transfer the liquid crystal layer to the bend orientation even if a region (for example, a gap region between electrodes) in which the splay orientation remains at the time of the bend orientation is present and more uniformly transfer the liquid crystal layer to the splay orientation after the OFF sequence period 202 is completed. In the case of this embodiment, it is preferable that the OFF sequence period 202 is 100 msec or more when a voltage to be applied is approx. 1.5 times higher than the black display voltage.

When the OFF sequence period 202 is completed, the driver 2 starts a power-supply OFF period 203. When the power-supply OFF period 203 is started, the driver 2 opens the switch 6 to cut off the power to be supplied from the liquid-crystal-driving power supply portion 3. In this case, because a voltage to be supplied to the liquid crystal layer 1 becomes 0 V while the alignment of liquid crystals of the liquid crystal layer 1 is in a uniform state, it becomes possible that the OCB mode liquid crystal can be uniformly transferred to the splay orientation from the bend orientation.

In the case of the liquid crystal display apparatus of this embodiment, when the OFF sequence period 203 is 100 msec, it is possible to change the liquid crystal layer 1 from the bend orientation to the uniform splay orientation. This provides for a quicker transition to the uniform splay orientation after turning off the power supply compared to the case of the liquid crystal display apparatus of the embodiment 1.

Therefore, even if turning on the power supply again within 5 sec after 100 msec passes from turning off the power supply at room temperature, the period until an image is displayed is decreased similarly to the case of the liquid crystal display apparatus of the embodiment 1, even if the period until the power supply is turned on again is short, because the second splay orientation is not present.

The above description of this embodiment says that it is preferable that a voltage to be applied to the liquid crystal layer 1 is 1.5 time or higher than the black display voltage. However, when the voltage exceeds the black display voltage, the similar advantage as described above can be obtained even for a voltage lower than 1.5 times though differing in degree.

Embodiment 3

Figure 4:
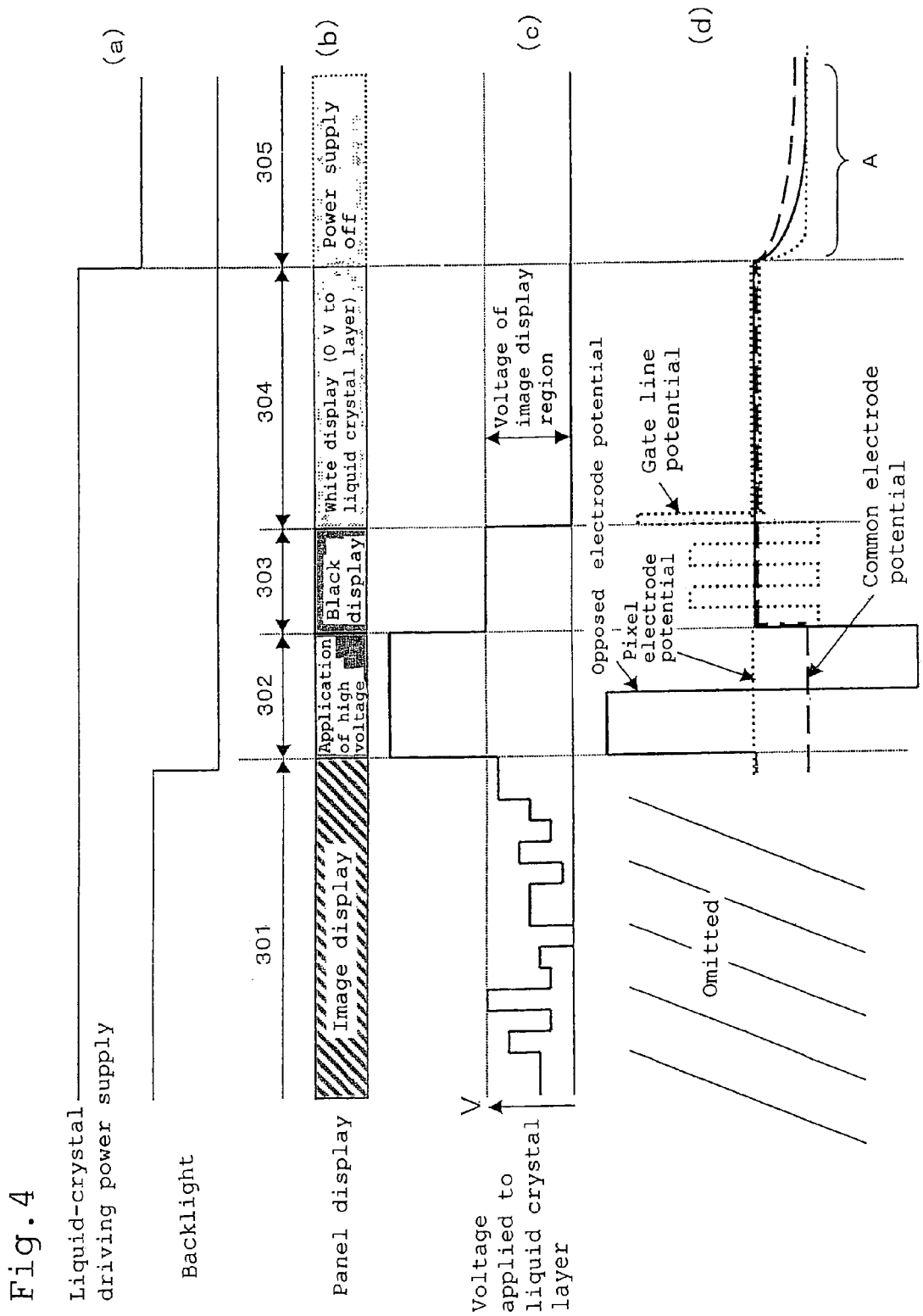
FIG. 4 is an illustration showing operations of the liquid crystal display apparatus of the embodiment 3 of the present invention.

FIG. 4 shows a time chart of a power-supply OFF sequence of a liquid crystal display apparatus of embodiment 3 of the present invention. In FIG. 4, reference character (a) denotes operations of a liquid crystal driving power supply and a backlight, (b) denotes operations of a panel display, (c) denotes a voltage applying operation to a liquid crystal layer, and (d) denotes a change of potentials of each electrode.

Because a configuration of the liquid crystal display apparatus of this embodiment is the same as that of the liquid crystal display apparatus of the embodiment 1, its description is omitted.

In the image display period 301 shown in FIG. 4, various voltages are applied from the driver 2 to the liquid crystal layer 1 to display an image on a display face. That is, because voltages to be applied to the liquid crystal layer 1 differ in the region of the liquid crystal layer depending on an image to be displayed, the alignment of liquid crystals is ununiform.

When the switch 4 is turned off, the driver 2 completes the image display period 301, turns off the backlight 5, and starts OFF sequence periods 302, 303, and 304. First in the OFF sequence period 302, the driver 2 applies a voltage equal to or lower than a maximum voltage which exceeds the voltage of the image display region and can be applied to the liquid crystal layer 1 to the whole of the liquid crystal layer 1. In this case, it is preferable that a voltage to be applied to the liquid crystal layer 1 in the OFF sequence period 302 is 1.5 times or higher than a voltage for black-display.

In this case, the driver 2 applies alternating voltages to the liquid crystal layer 1. That is, as shown in FIG. 4, voltages having the same intensity and directions opposite to each other are alternately applied between the pixel electrode 402 and the opposed electrode 408 in the first half and the second half of the OFF sequence period 302. When the alternating voltages are applied to the liquid crystal layer 1 as described above, it is possible to prevent uneven distribution of liquid crystal ions. As a result, it is possible to prevent the flicker in the liquid crystal layer 1 to reduce a shift of white display, and to further decrease the time up to splay.

When a voltage in the OFF sequence period 302 is hither than a black display voltage, the alignment of liquid crystals in the liquid crystal layer 1 more quickly becomes uniform. In the case of this embodiment, it is preferable that the OFF sequence period 302 is 100 msec or more when a voltage to be applied is approx. 1.5 times higher than the black display voltage.

When the OFF sequence period 302 is completed, the driver 2 starts an OFF sequence period 303. When a display screen is normally white, the driver 2 applies alternating voltages for displaying black gradation on the entire display face to the liquid crystal layer 1. Thus, in the OFF sequence period 303, it is preferable that a black display voltage is applied for 100 msec or more.

Thus, by applying a high voltage in the OFF sequence period 302 and thereafter applying alternating voltages for black display in the OFF sequence period 303, it is possible to stabilize flicker compared to the case of only the OFF sequence period 302 and the period up to the transition to the splay orientation can be further decreased.

After the OFF sequence period 303 is completed, the driver 2 starts an OFF sequence period 304. When a display screen is normally white, the driver 2 applies a voltage for displaying white gradation on the entire display face to the liquid crystal layer 1 in the OFF sequence period 304. That is, the driver 2 brings the potential difference between the opposed electrode 408 and the pixel electrode 402 into zero. Moreover, the driver 2 performs control so as to bring at least either of the potential difference between the gate line 407 and the pixel electrode 402 and the potential difference between the common electrode 409 (electrode other than the pixel electrode) and the pixel electrode 402 into zero in order to facilitate the transition to the splay orientation.

In this case, because the alignment of liquid crystals on the liquid crystal layer 1 is uniform and a voltage to be applied to the liquid crystal layer 1 becomes 0 V, it is possible that the OCB mode liquid crystal can be uniformly changed from the bend orientation to the splay orientation.

After the OFF sequence period 304 is completed, the driver 2 starts a power-supply OFF period 305. When the power-supply OFF period 305 is started, the driver 2 opens the switch 6 to cut off the power to be supplied from the liquid crystal driving power supply 3.

When the power-supply OFF period 305 is started, transition to the splay orientation is started because potentials of the opposed electrode, pixel electrode, gate line, and common electrode are the same. Reference numerals 503 and 504 shown in FIG. 5 show progress of the above transition (inverse transfer) to the splay orientation. That is, because there is no potential difference between the pixel electrode 402 and the common electrode 409 at the time of start of the power-supply OFF period 305, the inverse transfer 504 occurs from the common electrode 409 toward the central portion of the pixel electrode 402 on the pixel electrode 402. Moreover, because there is no potential difference between the pixel electrode 402 and the gate line 407, the inverse transfer 503 occurs from the gate line 407 toward the central portion of the pixel electrode 402 on the pixel electrode 402. These inverse transfers 503 and 504 occur because a pillar spacer 505 serves as a starting point in the case of the example shown in FIG. 5. Moreover, because the inverse transfers 503 and 504 progress toward the central portion of the pixel electrode 402 with elapse of time, change to the splay orientation is more quickly completed.

Furthermore, in the period from the point of time when the power-supply OFF period 305 is started until each potential reaches the ground level {that is, the region A shown in (d) of FIG. 4}, even if a difference occurs between each potential, the potential difference does not reach a transfer potential. That is, if there is no OFF sequence period 304, there is a possibility that the difference between potentials reaches the transfer potential. However, by adding the OFF sequence period 304, the possibility disappears. Therefore, the OCB mode liquid crystal can more quickly change to the splay orientation by adding the OFF sequence period 304 compared to cases of only the OFF sequence period 302, only the OFF sequence period 303, and only the OFF sequence periods 302 and 303. It is preferable that the OFF sequence period 304 continues for 2 sec or more.

The description of this embodiment says that alternating voltages are applied in the OFF sequence periods 302 and 303. However, it is also allowed that a constant voltage is applied. Also in this case, the same advantage as described above can be obtained on the point that transition to the splay orientation is accelerated.

Moreover, in the case of the description of this embodiment, it is allowed that a voltage at which substantially white gradation is displayed on a display face is applied to the liquid crystal layer 1 in the OFF sequence period 304. Also in this case, the same advantage as described above can be obtained.

Furthermore, the description of this embodiment says that after the image display period 301 is completed, the OFF sequence period 302, OFF sequence period 303, and OFF sequence period 304 are completed in this order and then, the power-supply OFF period 305 is started. However, it is also allowed that the OFF sequence period 303 is started after the image display period 301 is completed and the power-supply OFF period 305 is started via the OFF sequence period 304 after the OFF sequence period 303 is completed. Also in this case, the same advantage as described above can be obtained.

Moreover, it is allowed that the OFF sequence period 302 is started after the image display period 301 is completed and the power-supply OFF period 305 is started via the OFF sequence period 304 after the OFF sequence period 302 is completed. Also in this case, the same advantage as described above can be obtained.

The description of the embodiments 1 and 2 says that the power-supply OFF period 103 or 203 is started via the OFF sequence period 102 or 202 after the image display periods 101 or 201 is completed. It is also considered that the OFF sequence period 302 is started after the image display period 101 or 201 is completed and the power-supply OFF period 103 or 203 is started through the OFF sequence period 303 after the OFF sequence period 302 is completed. In this case, the alignment of liquid crystals in the liquid crystal layer 1 quickly becomes constant in the OFF sequence period 302 and it is possible to stabilize flicker in the OFF sequence period 303. Therefore, it is possible to more quickly change to the splay orientation compared to the case of only the OFF sequence period 302 or 303.

Moreover, the description of the embodiments 1 and 2 says that a constant voltage is applied in the OFF sequence periods 102 and 202. However, it is also allowed that alternating voltages are applied similarly to the case of the embodiment 3. In this case, it is possible to prevent uneven distribution of liquid crystal ions. As a result, it is possible to prevent flicker in the liquid crystal layer 1, to decrease a shift of white display, and to further decrease the period up to the splay.

Furthermore, the description of this embodiment says that alternating voltages are applied in the OFF sequence periods 302 and 303. However, it is also allowed that a constant voltage is applied in these periods. In this case, an advantage that transition to the splay orientation is accelerated is the same as described above though the advantage that the flicker characteristic is improved cannot be obtained. In this case, by setting the black display period like the case of the OFF sequence period 303, it is possible to more effectively generate an inverse transfer in accordance with the twist forming effect by a lateral electric field, which is mentioned later.

The above descriptions say that a voltage to be applied to the liquid crystal layer 1 is uniform. However, when a voltage exceeding a black display voltage is applied, it is allowed that the voltage is ununiform. Also in this case, the same advantage as described above can be obtained.

Moreover, the above descriptions say that the liquid crystal layer 1 is normally white. However, it is allowed that the liquid crystal layer 1 is normally black. When including the above case, it is only necessary to apply a voltage at which white is substantially displayed on a display face in the OFF sequence periods 102 and 303. Moreover, in the OFF sequence periods 202 and 302, it is only necessary to apply a voltage higher than a voltage at which white is displayed on a display face and equal to or lower than a voltage which can be applied to the liquid crystal layer 1. Furthermore, in the OFF sequence period 304, it is only necessary to apply a voltage at which substantially black is displayed on a display face. Thus, even if the liquid crystal layer 1 is normally black, the same advantage as described above can be obtained.

Furthermore, in descriptions of the above embodiments, an expression that a voltage is applied to the liquid crystal layer 1 represents that a voltage is applied between the pixel electrode 402 and the opposed electrode 408.

Furthermore, the above descriptions say that irradiation with the backlight 5 is turned off at the same time as completion of the image display periods 101, 201, and 301. However, it is also allowed that irradiation with the backlight 5 is turned off after the OFF sequence periods 102, 202, and 304 are completed. Furthermore, it is allowed that irradiation with the backlight 5 is turned off during the OFF sequence periods 102, 202, and 304 are started after the image display periods 101, 201, and 301 are completed. Also in this case, because the liquid crystal layer 1 can change from the bend orientation to the splay orientation in a uniform state, unevenness does not occur on a display screen.

Furthermore, it is allowed that irradiation with the backlight 5 is turned off before the image display periods 101 and 201 are completed.

Furthermore, in the above descriptions, a configuration is described in which the switch 4 is connected to the driver 2. However, it is not always necessary that the switch is connected to the driver 2 when an on/off signal of the switch 4 can be transferred to the driver 2.

Furthermore, the above descriptions show a configuration in which the backlight 5 is connected to the driver 2. However, it is not always necessary that the backlight 5 is connected to the driver 2, when the operation of turning off the backlight 5 can be performed after the above predetermined sequence.

Furthermore, it is described that the liquid crystal display apparatuses of the above embodiments respectively have a common electrode 409. However, it is also allowed that the common electrode 409 is not used. In this case, the inverse transfer 203 shown in FIG. 5 is generated from the adjacent front-stage gate line 407.

Embodiment 4

Liquid crystal displays of the embodiments 1 to 3 respectively first perform the operation of applying a voltage used for display or a voltage higher than the display voltage to the liquid crystal layer 1 when the power supply is turned off and once uniforming the splay orientation remaining in a pixel to the bend orientation.

The liquid crystal display apparatus of this embodiment is based on the concept of forming the core of the splay orientation, that is, the core of inverse transfer on all pixels. Details are described below.

When bringing a voltage to be applied to the liquid crystal layer 1 into almost 0 V, the bend orientation changes to the twist orientation. This shows that the bend orientation and twist orientation are continuously connected to each other with no barrier in terms of energy. However, whether the twist is clockwise or counterclockwise is theoretically equivalent. We found that when intentionally forming the region of the clockwise twist and the region of the counterclockwise twist, a disclination line is formed between the regions and the splay orientation occurs by using the disclination line as a starting point. The disclination line denotes an orientation transition region seen linear, and in the region, a liquid crystal molecule continuously changes its orientated direction in the plane. Moreover, it is estimated that a region similar to the splay orientation and having a little twist deformation is locally formed. By intentionally forming the region similar to the splay orientation, it is possible to form the core of the splay orientation, that is, the core of inverse transfer.

Figure 10:
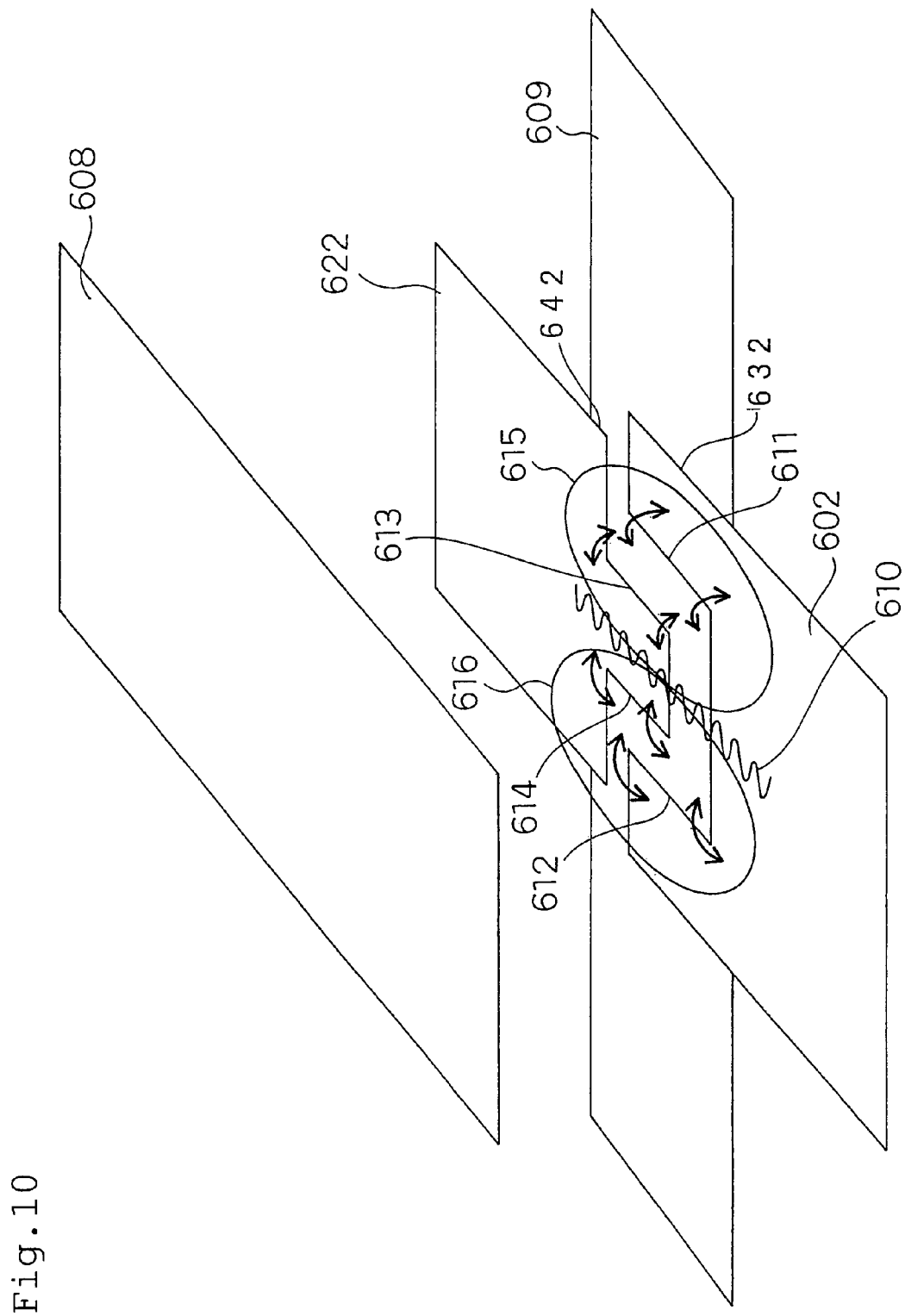
FIG. 10 is a perspective view showing an electrode structure of the liquid crystal display apparatus of embodiment 4 of the present invention.

FIG. 10 schematically shows the structure of each electrode used for the liquid crystal display apparatus of this embodiment for realizing such a concept. Reference numeral 602 denotes a pixel electrode in a specific pixel, 622 denotes a pixel electrode adjacent to the pixel electrode 602 in an orientated direction of the liquid crystal (a direction of the source line 406), 609 denotes a common electrode corresponding to a specific electrode of the present invention as an example. The common electrode 609 is shown as a longitudinal shape in FIG. 10. The pixel electrodes 602 and 622 are set via dielectrics 632 and 642 in such a manner that a part of the pixel electrodes 602 and 622 are opposed to a part of the common electrode 609. A first portion 611 and a second portion 612 are formed on the contour of the pixel electrode 602 vertically to the longitudinal direction of the common electrode 609. That is, the first portion 611 and the second portion 612 are formed in parallel with the oriented direction of the OCB mode liquid crystal in the same plane as the pixel electrodes 602 and 622. Similarly, a first portion 613 and a second portion 614 are formed on the contour of the pixel electrode 622 vertically to the longitudinal direction of the common electrode 609.

Figure 11:
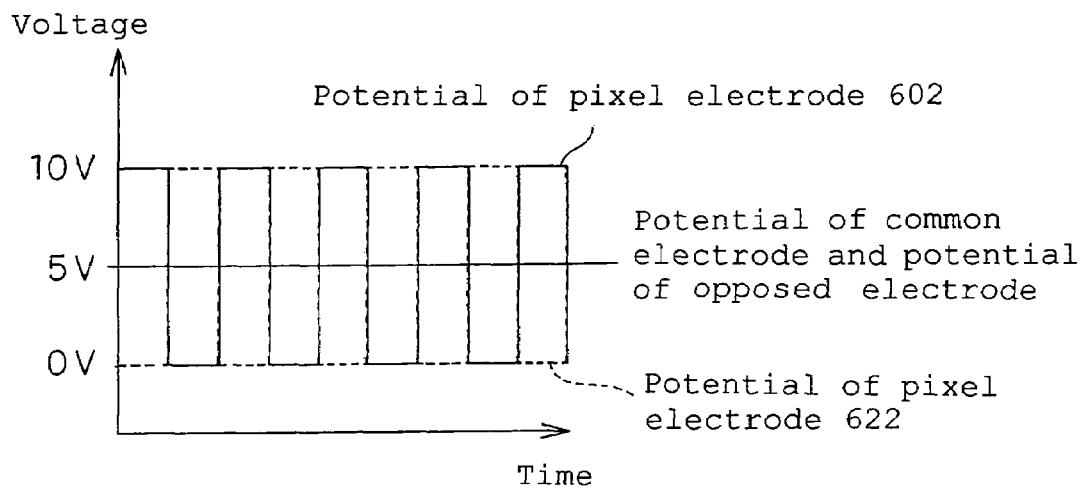
FIG. 11 is an illustration of explaining operations of the liquid crystal display apparatus of the embodiment 4 of the present invention.

Then, operations of the liquid crystal display apparatus of this embodiment having the above electrode configuration are described below. FIG. 11 is an example showing a voltage waveform to be applied to each electrode shown in FIG. 10. Voltages reversed each other (dot inversion driving) are applied to the pixel electrodes 602 and 622 adjacent via the common electrode 609. In the case of the example shown in FIG. 11, a voltage of 5 V is applied between each pixel electrode and opposed electrode. Therefore, for example, when the liquid crystal layer 1 is normally white, a black display voltage is applied to the liquid crystal layer 1.

Figure 12:
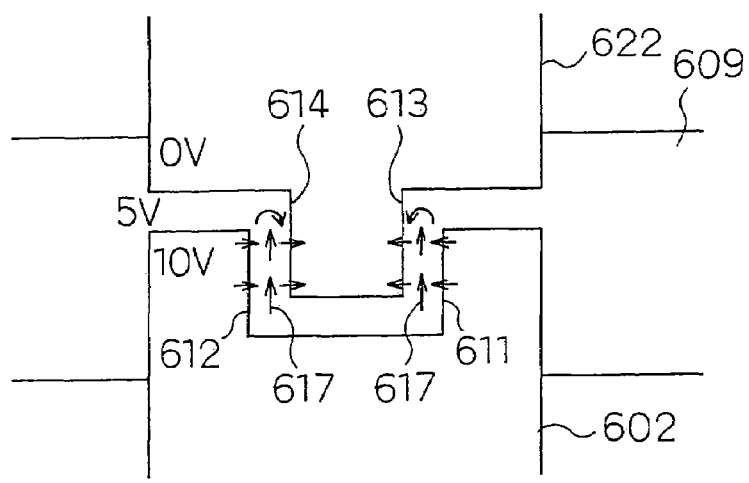
FIG. 12 is a plane view of an electrode structure to explain operations of the liquid crystal display apparatus of the embodiment 4 of the present invention.

For example, FIG. 12 shows a state in which 10 V is applied to the pixel electrode 602 and 0 V is applied to the pixel electrode 622 in the operation of the dot reversing operation. FIG. 12 is a plane view of each electrode having the configuration of FIG. 10, viewed from the opposed electrode 608 side. While the voltage is applied as described above, an electric field is generated in the left direction in the figure relative to the oriented direction 617 of the OCB mode liquid crystal with the first portion 611 of the pixel electrode 602 as a boundary and an electric field is also generated in the same direction in the first portion 613 of the pixel electrode 622. As a result, the OCB mode liquid crystal oriented nearby the first portions 611 and 613 generates a leftward (counterclockwise) twist in the same plane (counterclockwise twist region 615 in FIG. 10). Moreover, an electric field is generated rightward with the second portion 612 of the pixel electrode 602 as a boundary and a same-directional electric field is also generated in the second portion 614 of the pixel electrode 622. As a result, the OCB mode liquid crystal oriented nearby the second portions 612 and 614 generates a clockwise twist (clockwise twist region 616 in FIG. 10) in the same plane.

The counterclockwise twist region 615 and clockwise twist region 616 thus generated generates a disclination line 610 at the boundary between the both regions. Then, inverse transfer very stably occurs in each pixel because the disclination line 610 serves as a core, and the bend orientation quickly changes to the splay orientation over the entire display face.

Figure 16:
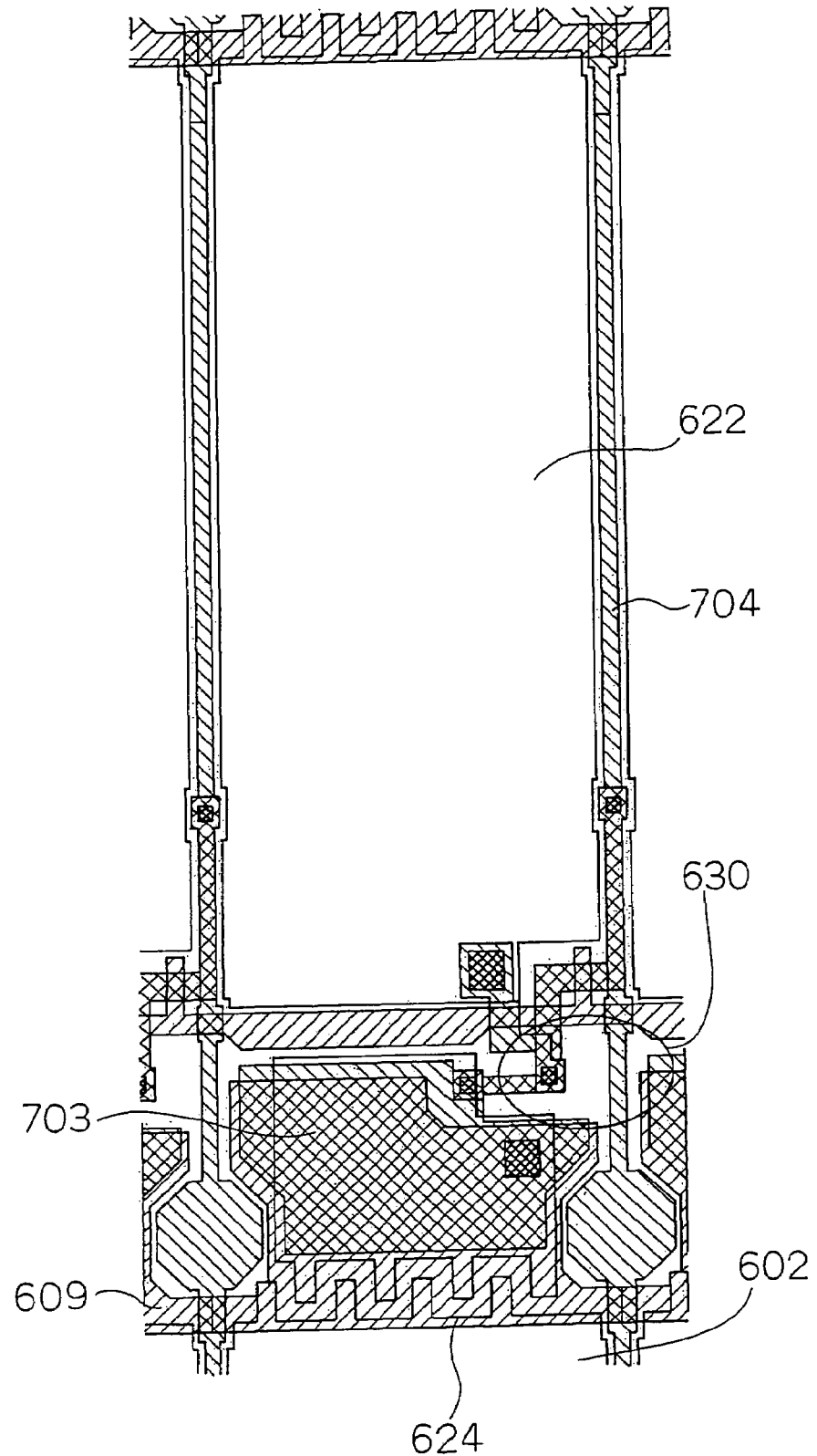
FIG. 16 a plane view showing a pixel structure of the liquid crystal display apparatuses of the embodiment 4 and embodiment 5 of the present invention.

As shown by the example in FIG. 12, it is allowed to apply a clockwise lateral electric field to form a clockwise twist and a counterclockwise lateral electric field to form a counterclockwise twist. An electrode of generating the clockwise lateral electric field and counterclockwise lateral electric field is hereafter referred as a zigzag electrode. Moreover, to generate many disclination lines 610 in one pixel, it is also allowed to continuously form the configuration shown in FIG. 12 and use it as a zigzag electrode 624 as shown in FIG. 16. The example shown in FIG. 16 has a configuration of forming the zigzag electrode 624 by an ITO pattern and applying a lateral electric field between the zigzag electrode 624 and the common electrode 609 formed under the zigzag electrode 624. When forming the zigzag electrode 624 by the ITO pattern of a pixel electrode, applying a voltage to be black-displayed as a lateral electric field to the zigzag electrode 624 is the most effective to form the core of the splay orientation. Moreover, it is possible to effectively form a clockwise twist and a counterclockwise twist by releasing electric charge from a state in which the lateral electric field is applied and changing to a 0-V state.

As described above, in the case of the liquid crystal display apparatus of this embodiment, because the core of the splay orientation can be actively formed for every pixel when turning off a power supply, it is possible to quickly change a display face from the bend orientation to the splay orientation.

In the case of the liquid crystal display apparatus of this embodiment, it is a feature to apply an electric field between the common electrode 609 formed at the lower portion and the pixel electrodes 622 and 602 formed at the upper layer. In this case, it is also allowed to generate a lateral electric field by applying +10 V to the pixel electrode 622, 0 V to the pixel electrode 602, and 5 V to the pixel electrode 609 like the case of performing black display, and by bringing all potentials including the potential of the opposed electrode 608 into 0 V while forming a twist, to form a disclination using the influence of the twist orientation initially formed so that the core of the splay orientation might be formed.

Moreover, there is a method of applying a lateral electric field while applying the voltage of white display, that is, 0 V between the pixel electrodes 622, 602 and the opposed electrode 608. In this case, by applying 0 V to the common electrode 609 and equally applying 5 V to the pixel electrodes 622, 602 and the opposed electrode 608, it is possible to generate a twist by a lateral electric field at the portion of the common electrode 609 while generating inverse transfer by applying 0 V to liquid crystals on the pixel electrodes 622 and 602.

Figure 17B:
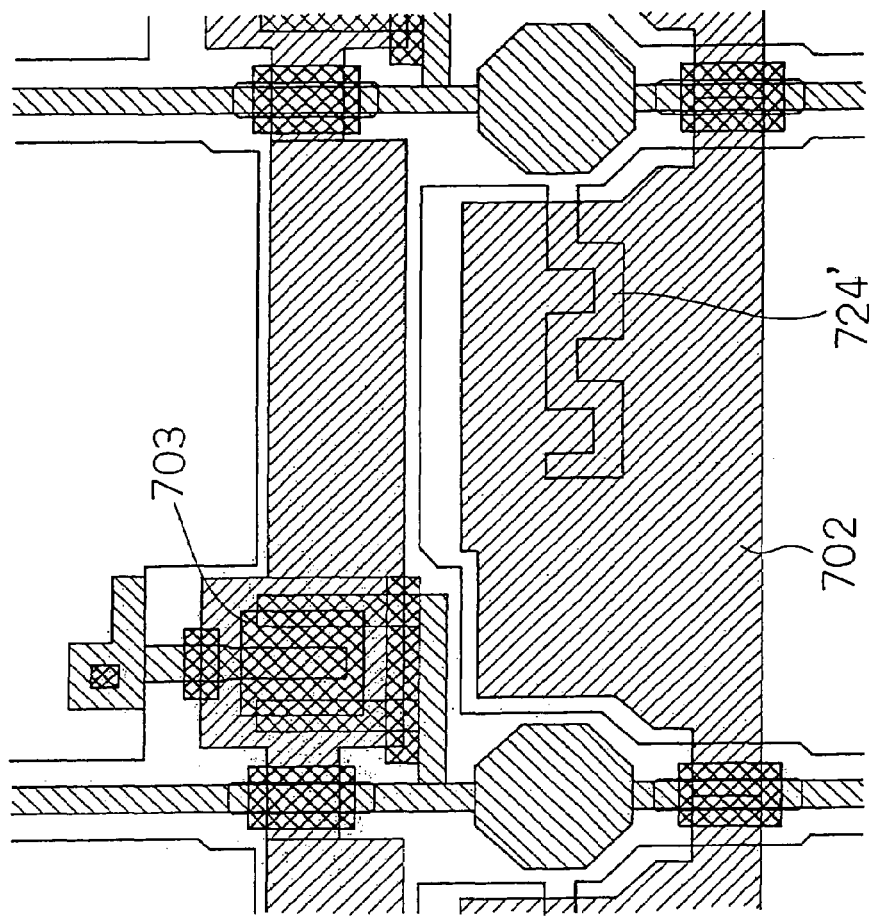
FIG. 17(*a*) is a plane view showing a pixel structure of the liquid crystal display apparatus of the embodiment 4 of the present invention.
Figure 17A:
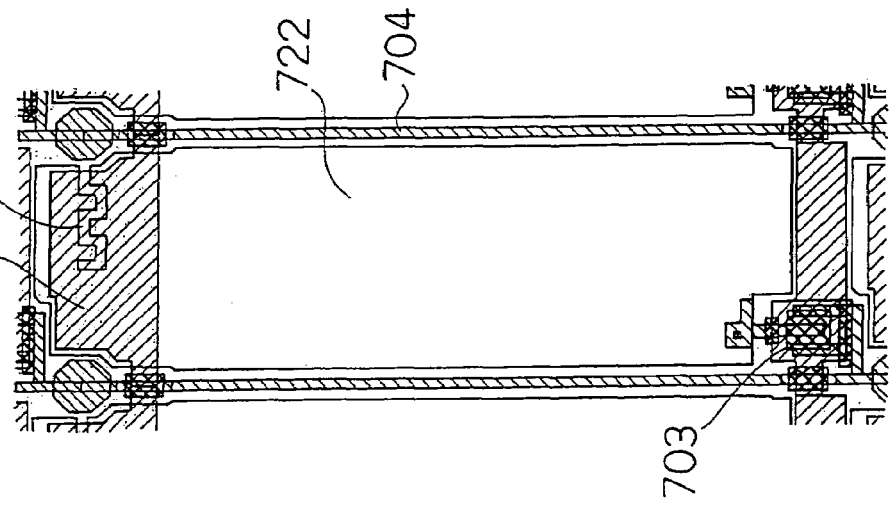

Though an example is described above in which a pixel electrode adjacent in the oriented direction of the OCB mode liquid crystal is dot-inversion-driven, it is also considered that the zigzag electrode 624 is formed on one pixel electrode. Moreover, it is allowed that a part of the contour of one pixel electrode has a configuration having only the first portion 611 and second portion 612. FIGS. 17(*a*) and 17(*b*) show a configuration of a pixel in the above case. FIG. 17(*b*) is a partially enlarged view of FIG. 17(*a*). In this case, a zigzag electrode 724 is formed in the region where only a common electrode 729 and a pixel electrode 722 are overlapped each other. A zigzag electrode 724' shown in FIG. 17(*b*) is formed on a zigzag electrode 702 adjacent in the oriented direction of the OCB mode liquid crystal. According to this configuration, it is possible to decrease a parasitic capacity between electrodes and the same advantage as described above can be obtained.

Figure 18B:
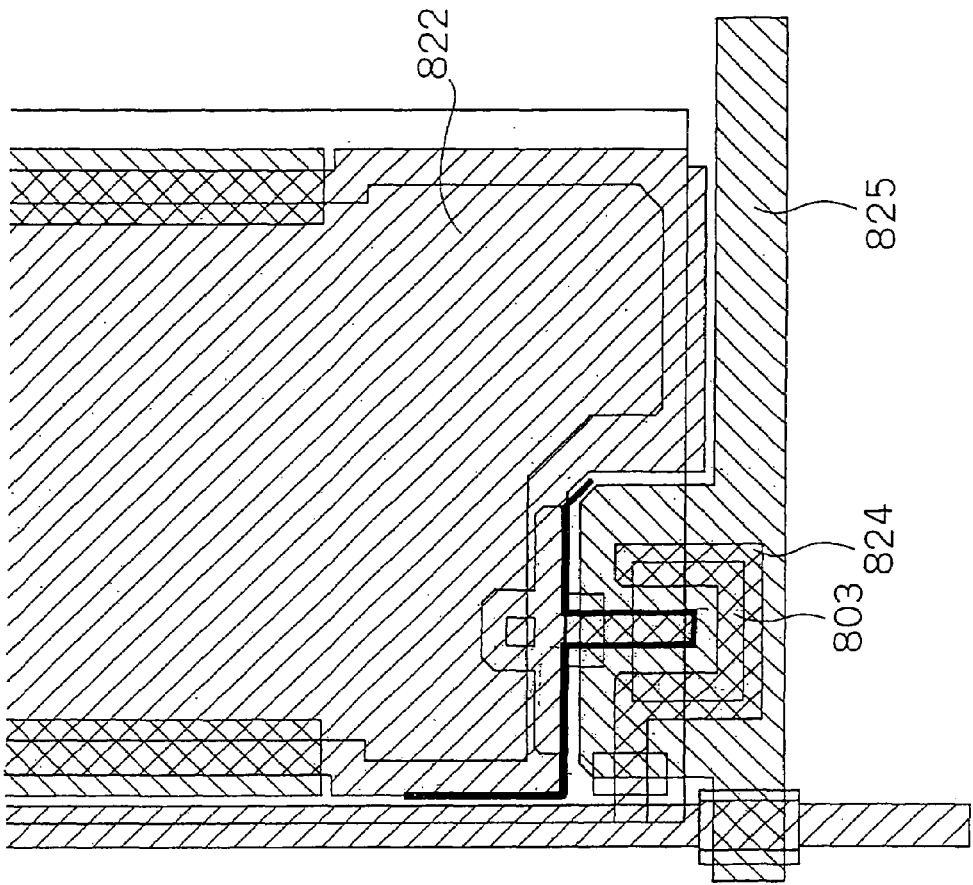
FIG. 18(*a*) is a plane view showing a pixel structure of the liquid crystal display apparatus of the embodiment 4 of the present invention.
Figure 18A:
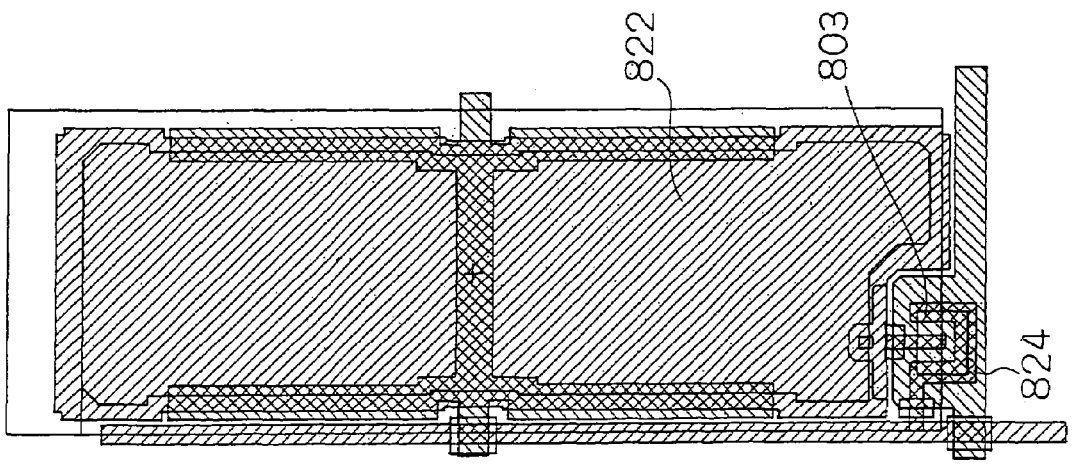

FIGS. 18(*a*) and 18(*b*) show another example in which a zigzag electrode is formed on one pixel electrode. FIG. 18(*b*) is a partially enlarged view of FIG. 18(*a*). In this case, a zigzag electrode 824 is formed on a gate electrode 825 which is another example of a specific electrode of the present invention. Moreover, the zigzag electrode 824 also serves as a part of the structure of a TFT 803. Also in this case, it is possible to form the core of the splay orientation similarly to the above mentioned when the power supply is turned off.

Figure 13:
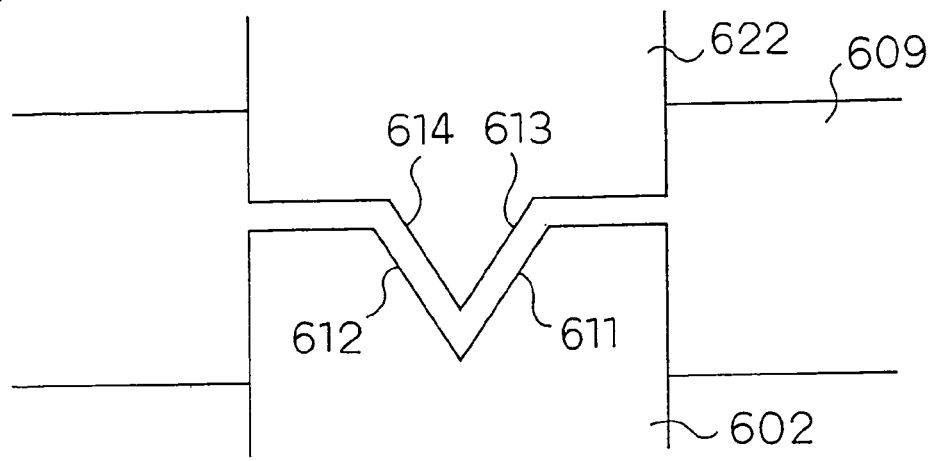
FIG. 13 is a plane view showing another electrode structure of the liquid crystal display apparatus of the embodiment 4 of the present invention.

Furthermore, for the above example, a case is described in which the first portions 611 and 613 and the second portions 612 and 614 of ach zigzag electrode are parallel with the oriented direction of the OCB mode liquid crystal. However, it is not always necessary that they are parallel with the oriented direction of the OCB mode liquid crystal but it is allowed that they have a substantially parallel relation with it. Further, even if they do not have a parallel relation, they may have a relation other than vertical. For example, FIG. 13 shows a configuration of an electrode in the above case. Also in this case, the same advantage can be obtained because it is possible to generate twists in directions opposite to each other. That is, when the direction of a twist generated by a lateral electric field generated with a first portion as a boundary is opposite to the direction of a twist generated by a lateral electric field generated with a second portion as a boundary, the same advantage as described above can be obtained irrespective of the relation between the first portion and the oriented direction of the OCB mode liquid crystal, and the relation between the second portion and the oriented direction of the OCB mode liquid crystal.

Furthermore, a case is above described in which the first portions 611 and 613 form a counterclockwise twist region and the second portions 612 and 614 form a clockwise twist region. However, it is a matter of course that there is a reverse case. When the first portions 611 and 613 generate an electric field in one twisted direction, the second portions 612 and 614 generate an electric field in the other twisted direction.

Figure 14:
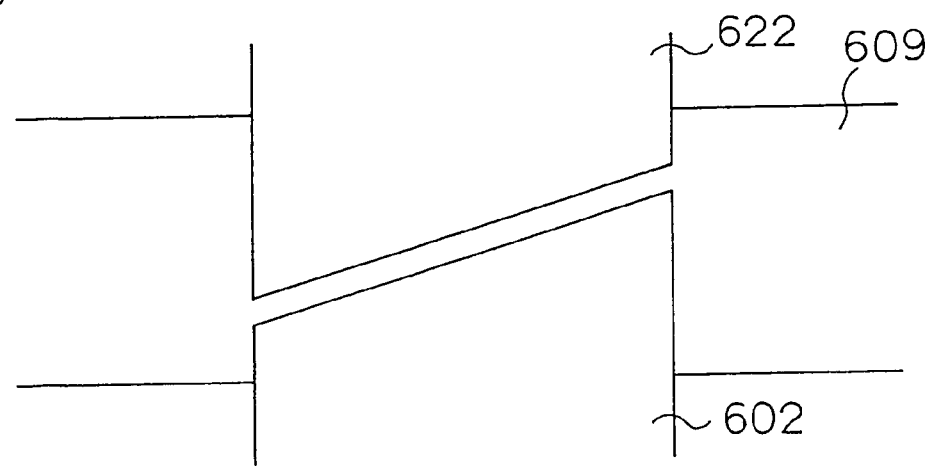
FIG. 14 is a plane view showing still another electrode structure of the liquid crystal display apparatus of the embodiment 4 of the present invention.

Furthermore, though the above description premises that the first portion 611 and the second portion 612 are present in each zigzag electrode, a case is also considered in which only either of the first portion 611 and second portion 612 is present. In this case, a disclination line is not formed because both the counterclockwise twist region 615 and clockwise twist region 616 are not formed. However, when either twist region is formed, there is a high possibility that it becomes the core of the splay orientation. Therefore, the same advantage as described above can be obtained though differing in degree. For example, as shown in FIG. 14, a configuration is considered in which parts of contours of the pixel electrodes 602 and 622 only diagonally cross the common electrode 609.

Figure 15:
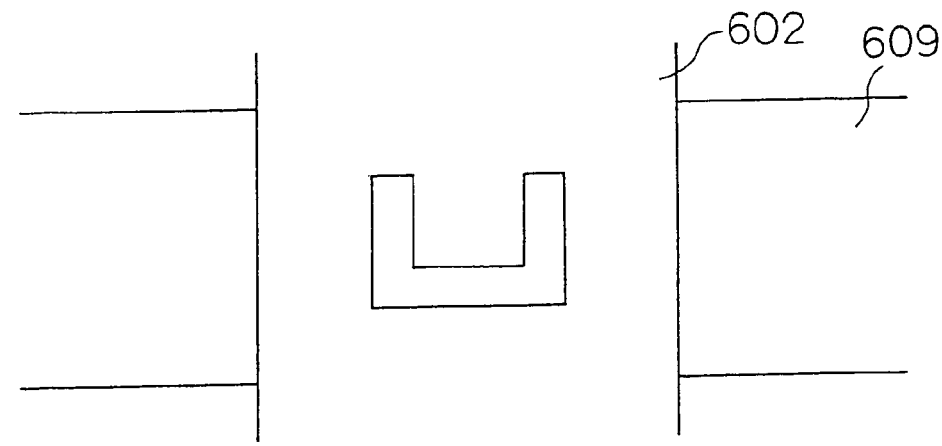
FIG. 15 is a plane view showing a still another electrode structure of the liquid crystal display apparatus of the embodiment 4 of the present invention.

In this embodiment, the contour of a pixel electrode does not denote only the shape of the external circumference of the pixel electrode but it also includes the shape of a hole or cutout formed in the pixel electrode (for example, refer to FIG. 15).

Moreover, each common electrode of this embodiment may use a front-stage gate line. For example, as shown in FIGS. 18(*a*) and 18(*b*), it is allowed to form a TFT 803 having a U-shaped structure on a gate electrode 825. In the case of this structure, a portion effective for twist formation on the contour of a pixel electrode is the portion shown by a thick continuous line in FIG. 18(*b*). Thus, it is allowed that a protruded structure protrudes to a lower electrode structure like a gate line.

It is also considered that other electrodes of a common electrode and a gate electrode are arranged so as to be opposed each other via a pixel electrode and a dielectric. That is, when a specific electrode of the present invention is an electrode other than a pixel electrode, electric charge may be generated at the boundary with a pixel electrode. In this case, the same advantage as described above can be obtained.

Moreover, the above description says that when a display screen is normally white, a lateral electric field is formed by applying a voltage for black-display to each zigzag electrode. However, a voltage to be applied to each zigzag electrode is not restricted to black display voltage. Any voltage can be used as long as the voltage allows a lateral electric field to be formed in a pixel. Even in this case, the same advantage as described above can be obtained.

Furthermore, application of a lateral electric field described for this embodiment can be combined with the liquid crystal display apparatuses of the embodiments 1 to 3. For example, in the case of the embodiments 1 and 2, it is possible to insert a lateral-electric-field applying period between the OFF sequence periods 102 and 202 and the power-supply OFF periods 103 and 303. Furthermore, in the case of the embodiment 3, it is possible to apply a lateral electric field simultaneously with the OFF sequence period 304. Alternately, it is possible to apply a lateral electric field simultaneously with the OFF sequence periods 102, 202, and 303 of the embodiments 1 and 2. In this case, however, it is necessary to release electric charge between each pixel electrode and opposed electrode (voltage for white display is applied) while leaving a lateral electric field after these sequence periods are completed. This is because under a state in which a voltage equal to or hither than a displayed gradation is applied between each pixel electrode and its opposed electrode, even if a lateral electric field is applied and the core of the splay orientation is formed, it disappears immediately. As described above, by combining application of a lateral electric field with the liquid crystal display apparatuses of the embodiments 1 to 3, it is possible to more quickly change a display face from the bend orientation to the splay orientation when turning off the power supply.

Furthermore, in the above descriptions, operation for applying a lateral electric field while applying a voltage for uniform gradation to a display face is described. However, the operations are also considered in which an ununiform voltage is applied between each pixel electrode and opposed electrode without applying a uniform voltage between each pixel electrode and opposed electrode when turning off the power supply and only a lateral electric field is applied to each pixel immediately after a display state is completed. In this case, the display face is not always changed from the bend orientation to the splay orientation. However, because the core of the splay orientation is actively formed in each pixel, it is possible to obtain a quick change to the splay orientation.

Furthermore, a predetermined time of the present invention in the descriptions of the above embodiments corresponds to the OFF sequence period 102 in the case of the embodiment 1, the OFF sequence period 202 in the case of the embodiment 2, and the OFF sequence period 304 or a combination of the OFF sequence periods 302, 303, and 304 in the case of the embodiment 3. In the case of the embodiment 4, the predetermined period corresponds to a period of time while the lateral electric field is applied. Furthermore, in the case of the embodiment 1 or 2, the predetermined period can be the OFF sequence periods 102 and 202 or the OFF sequence periods 302 and 303.

Furthermore, though the descriptions of the above embodiments are performed by premising that the backlight 5 is present, a case in which the backlight 5 is not present such as the case of reflection-type liquid crystal is considered. That is, even for a configuration in which the liquid crystal layer 1 is irradiated with only external light, the same advantage as described above can be obtained when the liquid crystal layer 1 can change from the bend orientation to the splay orientation in a uniform state when the power supply is turned off.

Embodiment 5

FIG. 16 is an illustration showing the liquid crystal display apparatus of the embodiment 5. The liquid crystal display apparatus of this embodiment has a feature that a non-voltage region 630 is formed in each pixel. The non-voltage region 630 is a region in which a pixel electrode 622, TFT 703, or source signal line 704 is not disposed in the pixel and no voltage is present for the opposed electrode 608. Moreover, it is necessary that the non-voltage region 630 has such a size that at least a part of the region 630 can maintain the splay orientation without being influenced by the circumferential bend orientation even in a state in which a display voltage is applied to the pixel. Preferably, it is necessary that the non-voltage region 630 has such a size that at least a part of the region 630 can maintain the splay orientation without being influenced by the circumferential bend orientation even in a state in which a voltage for displaying black gradation is applied to the display face for a long time (for example, 8 hr). More preferably, it is necessary that the non-voltage region 630 has a size equal to or larger than 400 $\mu m^2$.

Then, operations of the liquid crystal display apparatus of this embodiment are described below. As described above, because the portion of the splay orientation remains in the non-voltage region 630 even in a display state, the splay orientation quickly expands over the entire display face when the power supply is turned off. In this case, even if the circumference of the non-voltage region 630 is the bend orientation, particularly in a state in which the OCB mode liquid crystal stands, the splay orientation of the non-voltage region 630 is not influenced.

Therefore, according to the liquid crystal display apparatus of this embodiment, a display face can quickly change from the bend orientation to the splay orientation when the power supply is turned off independently of the display state of the display face before the power supply is turned off. That is, because of not depending on an invasion of the circumferential splay orientation or on accidental formation of the core of the splay orientation, the twist orientation does not remain for a long time and a display face can quickly change from the bend orientation to the splay orientation.

When the liquid crystal display apparatus of this embodiment is used by combining it with the liquid crystal display apparatuses of the embodiments 1 to 3 or the liquid crystal display apparatus of the embodiment 4, a display face can uniformly and further quickly change to the splay orientation when the power supply is turned off.

However, in the case of the liquid crystal display apparatus of this embodiment, because the splay orientation remains not depending on the state before the power supply is turned off, the same advantage can be obtained even if the liquid crystal display apparatus of this embodiment is not combined with the liquid crystal display apparatuses of the embodiments 1 to 4.

The present invention is a program of making a computer execute functions of all or some of means of the above-described liquid crystal display apparatuses of the present invention, which may be a program to be executed in collaboration with the computer.

Furthermore, the present invention is a medium carrying a program of making a computer execute all or some of functions of all or some of means of the above described liquid crystal display apparatuses of the present invention, which may be a medium in which a computer-readable program read by the computer executes the functions in collaboration with the computer.

Furthermore, some means of the present invention denote some of a plurality of means or some functions or some operations in one means.

Furthermore, some devices of the present invention denote some devices in a plurality of devices, some means in one device, or some functions in one device.

Furthermore, a computer-readable recording medium which records a program of the present invention is also included in the present invention.

Furthermore, it is allowed that one utilization conformation of a program of the present invention is a mode which is recorded in a computer-readable recording medium and operates in collaboration with a computer.

Furthermore, it is allowed that one utilization conformation of a program of the present invention is a mode which is transmitted through a transmission medium, read by a computer, and operates in collaboration with a computer.

Furthermore, the recording medium described above includes a ROM or the like and the transmission medium described above includes a transmission mechanism such as Internet, light, radio waves, and sonic waves.

Furthermore, it is allowed that the present invention may include not only pure hardware such as a CPU but also firmware, OS, and peripheral devices.

As described above, it is allowed to realize a configuration of the present invention in software or hardware.

EXAMPLE

FIG. 7 shows specific data for a difference between times of change to the splay orientation in accordance with a combination of OFF sequence periods in the liquid crystal display apparatuses of the embodiments 1 to 3. In FIG. 7, for example, black display (5 s, 6 V) denotes applying a black display voltage of 6 V for 5 sec. In the case of a conventional liquid crystal display apparatus, the period required for the entire panel face to change to the splay orientation is 36 sec. However, according to the liquid crystal display apparatus of the embodiment 1 of the present invention, the above time becomes 25 sec. Furthermore, according to the liquid crystal display apparatus of the embodiment 2 of the present invention, the above time becomes 12 sec. Moreover, according to the liquid crystal display apparatus of the embodiment 3 of the present invention, the above time becomes 5 sec. These data values are obtained after displaying an image by a fixed pattern for 1 hr and by measuring the values at room temperature. The above numerical values are only examples and combinations of various numerical values can be made.

Thus, according to a liquid crystal display apparatus of the present invention, it is found that it is possible to decrease the period required for the entire panel face to change to the splay orientation.

INDUSTRIAL APPLICABILITY

According to a liquid crystal display apparatus, liquid-crystal-display stopping method and its program, and a recording medium of the present invention, it is possible to prevent display screen unevenness from occurring after turning off a power supply in a liquid crystal display apparatus using OCB mode liquid crystal. Therefore, they are useful for a liquid crystal display apparatus and the like.

The invention claimed is:

1. A liquid crystal display apparatus comprising:
   a liquid crystal layer using an Optically Compensated Bend (OCB) mode liquid crystal having a bend orientation and a splay orientation;
   a driver applying a voltage to the liquid crystal layer;
   a liquid-crystal driving power supply supplying power to the driver; and
   a switch outputting an on/off signal to the driver;
   wherein
   said liquid crystal display apparatus includes a power supply OFF sequence period which is used when a power supply of said liquid crystal display apparatus is turned off, said power supply OFF sequence period including at least a first OFF sequence period, a second OFF sequence period, and a third OFF sequence period,
   i) in said first OFF sequence period, when an off signal to turn off said power supply of said liquid crystal display apparatus is output from the switch, said driver applies alternating voltages with different polarity equal to or lower than a maximum voltage which can be applied to said liquid crystal layer, said applied alternating voltages exceeding a voltage of an image display region to said liquid crystal layer,
   ii) in said second OFF sequence period after said first OFF sequence period, the driver applies alternating voltages with different polarity equal to or higher than a critical voltage of the OCB mode liquid crystal which can be applied to each of pixels of the liquid crystal layer for a predetermined time in order to transfer said liquid crystal layer to said bend orientation, and iii) in said third OFF sequence period after said second OFF sequence period, the driver applies a voltage lower than the critical voltage of the OCB mode liquid crystal for a predetermined time in order to transfer the liquid crystal layer to said splay orientation, and thereafter supplying of power to the driver from the liquid-crystal driving power supply is stopped to turn off said power supply of said liquid crystal display apparatus.

2. The liquid crystal display apparatus according to claim 1, wherein
said voltage equal to or higher than the critical voltage of the OCB mode liquid crystal is a voltage at which substantially black is displayed on a display of said liquid crystal display apparatus.

3. The liquid crystal display apparatus according to claim 1, wherein
said voltage lower than the critical voltage of OCB mode liquid crystal is a voltage at which substantially white is displayed on a display of said liquid crystal display apparatus.

4. The liquid crystal display apparatus according to claim 3, wherein
a pixel electrode to which an individual voltage is applied with respect to each pixel and an opposed electrode arranged opposite to each pixel electrode are disposed on the liquid crystal layer,
the voltage at which substantially white is displayed on the display face represents that a voltage between the opposed electrode and the pixel electrode, and a voltage between a gate line and the pixel electrode or a voltage between the pixel electrode and an electrode other than the pixel electrode are substantially zero.

5. The liquid crystal display apparatus according to claim 1 further comprising:
a backlight connected to the liquid-crystal driving power supply to irradiate the liquid crystal layer, wherein
when an off signal is output from the switch, irradiation from the backlight is stopped simultaneously when or before a predetermined voltage is applied to each of pixels of the liquid crystal layer from the driver.

6. The liquid crystal display apparatus according to claim 1, wherein
the voltage applied to each of pixels is a uniform voltage for each of the pixels.

7. The liquid crystal display apparatus according to claim 1, wherein
the liquid crystal layer is provided with a pixel electrode which is connected to the driver and to which a pixel voltage is supplied and a specific electrode which is connected to the driver, to which a voltage different from the pixel voltage is supplied, and which is disposed via a dielectric so as to be opposed to the pixel electrode,
the pixel electrode is disposed so that at least a part of the contour of the pixel electrode is not vertical to the oriented direction of the OCB mode liquid crystal,
when said off signal is output from the switch, the driver generates an electric field in a direction different from the oriented direction of the OCB mode liquid crystal between the pixel electrode and the specific electrode and after the elapse of predetermined time, supplying of power to the driver from the liquid-crystal driving power supply is stopped.

8. The liquid crystal display apparatus according to claim 7, wherein
the contour of the pixel electrode includes a first portion which generates an electric field not vertical to the oriented direction of the OCB mode liquid crystal but in a direction of twisting a part of the oriented-directional liquid crystal in one direction in a pixel and a second portion which generates an electric field in a direction of twisting another part of the oriented-directional liquid crystal in other direction.

9. The liquid crystal display apparatus according to claim 8, wherein
the first portion and the second portion are substantially parallel with the oriented direction of the OCB mode liquid crystal and alternately continuously formed.

10. The liquid crystal display apparatus according to claim 7, wherein
an opposed electrode arranged opposite to each of the pixel electrodes is further disposed on the liquid crystal layer,
when said off signal is output from the switch, the driver applies a voltage for substantially white display on a display face, between each of the pixel electrodes of the liquid crystal layer and the opposed electrode, thereafter, supplying of power to the driver from the liquid-crystal driving power supply is stopped.

11. The liquid crystal display apparatus according to claim 7, wherein
when said off signal is output from the switch, the driver applies a predetermined voltage equal to or higher than a critical voltage of the OCB mode liquid crystal but equal to or lower than the maximum voltage which can be applied to the liquid crystal layer to each of pixels of the liquid crystal layer, thereafter, applies a voltage for substantially white display on a display face, thereafter supplying of power to the driver from the liquid-crystal driving power supply is stopped.

12. The liquid crystal display apparatus according to claim 11, wherein
an electric field in a direction different from the oriented direction of the OCB mode liquid crystal is applied simultaneously when or after the voltage for white display on the display face is applied.

13. The liquid crystal display apparatus according to claim 7, wherein
two pixel electrodes adjacent in the oriented direction of the OCB liquid crystal mode are arranged on the specific electrode via a dielectric, and
contours of the two pixel electrodes are arranged so that they are not vertical to the oriented direction of the OCB mode liquid crystal and include a first portion of generating an electric field in a direction of twisting a part of the oriented-directional liquid crystal in one direction in a pixel and a second portion of generating an electric field in a direction of twisting another part of the oriented-directional liquid crystal in other direction.

14. The liquid crystal display apparatus according to claim 13, wherein
the driver applies voltages having phases opposite to each other to the two pixel electrodes.

15. A liquid crystal display apparatus according to claim 1, wherein
a pixel electrode to which an individual pixel voltage is applied with respect to each pixel and an opposed electrode arranged opposite to the pixel electrodes are disposed on the liquid crystal layer, and
a non-voltage region having no voltage applied to the opposed electrode is formed for each pixel in a region adjacent to a region where the pixel electrode and the opposed electrode are opposed to each other in the liquid crystal layer, and a size of the non-voltage region is such that even if the liquid crystal layer becomes bend orientation, at least a part of the region can maintain splay orientation.

16. The liquid crystal display apparatus according to claim 15, wherein a size of the non-voltage region is 400 μm² or more.

17. A stopping method for a liquid crystal display apparatus including a liquid crystal layer using an Optically Compensated Bend (OCB) mode liquid crystal having a bend orientation, and a splay orientation, a driver applying a voltage to the liquid crystal layer, a liquid crystal driving power supply supplying power to the driver and a switch outputting an on/off signal to the driver.

said stopping method comprising:

a power supply OFF sequence step of performing a power-supply OFF sequence which is used when a power supply of said liquid crystal display apparatus is turned off, said power supply OFF sequence step including at least a first OFF sequence step, a second OFF sequence step, and a third OFF sequence step, i) in said first OFF sequence step, when an off signal to turn off said power supply of said liquid crystal display apparatus is output from the switch, said driver applies alternating voltages with different polarity equal to or lower than a maximum voltage which can be applied to said liquid crystal layer, said applied alternating voltages exceeding a voltage of an image display region to said liquid crystal layer, ii) in said second OFF sequence step after said first OFF sequence step, the driver applies alternating voltages with different polarity equal to or higher than a critical voltage of the OCB mode liquid crystal which can be applied to each of pixels of the liquid crystal layer for a predetermined time in order to transfer said liquid crystal layer to said bend orientation, and iii) in said third OFF sequence step after said second OFF sequence step, the driver applies a voltage lower than the critical voltage of the OCB mode liquid crystal for a predetermined time in order to transfer the liquid crystal layer to said splay orientation, and thereafter supplying of power to the driver from the liquid-crystal driving power supply is stopped to turn off said power of said liquid crystal display apparatus.

* * * * *